United States Patent
Tabuchi et al.

(10) Patent No.: US 12,179,874 B2
(45) Date of Patent: Dec. 31, 2024

(54) TANK MADE OF RESIN

(71) Applicant: HONDA MOTOR CO., LTD., Tokyo (JP)

(72) Inventors: Daisuke Tabuchi, Wako (JP); Ko Kurata, Wako (JP); Atsushi Murakami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 753 days.

(21) Appl. No.: 16/759,938

(22) PCT Filed: Nov. 16, 2018

(86) PCT No.: PCT/JP2018/042467
§ 371 (c)(1),
(2) Date: Apr. 28, 2020

(87) PCT Pub. No.: WO2019/107186
PCT Pub. Date: Jun. 6, 2019

(65) Prior Publication Data
US 2020/0339206 A1    Oct. 29, 2020

(30) Foreign Application Priority Data

Nov. 30, 2017 (JP) .................. 2017-230929
Nov. 30, 2017 (JP) .................. 2017-231015

(51) Int. Cl.
*B62J 35/00* (2006.01)
*B60K 15/035* (2006.01)
*B60K 15/03* (2006.01)

(52) U.S. Cl.
CPC .............. *B62J 35/00* (2013.01); *B60K 15/035* (2013.01); *B60K 2015/03059* (2013.01); *B60K 2015/03486* (2013.01); *B60K 2015/03528* (2013.01)

(58) Field of Classification Search
CPC .............. B60K 15/03177; B60K 15/04; B60K 15/035; B60K 2015/03453;
(Continued)

(56) References Cited

U.S. PATENT DOCUMENTS 3,349,953 A * 10/1967 Conaway ............... B65D 90/52
220/88.1
3,400,854 A * 9/1968 Conaway ............. B60K 15/077
220/734
(Continued)

FOREIGN PATENT DOCUMENTS

DE     102013004931 A1    9/2014
EP        1211196 A1    6/2002
(Continued)

OTHER PUBLICATIONS

Indian Office Action dated Apr. 5, 2021, 5 pages.
(Continued)

*Primary Examiner* — Allan D Stevens
(74) *Attorney, Agent, or Firm* — Rankin, Hill & Clark LLP

(57) ABSTRACT

A tank made of resin capable of enhancing freedom of a tank shape and improving an ease of installation in a vehicle body. The tank made of resin is provided with a tubular projection projecting to an inside and an outside of a wall surface of a tank body that has a barrier layer, and an end edge part of the barrier layer is molded integrally with an outer peripheral resin part of the tubular projection.

2 Claims, 13 Drawing Sheets

(58) Field of Classification Search
CPC ........... B60K 2015/03046; B60K 2015/03557;
B60K 2015/03542; B60K 2015/03072;
B60K 2015/03078; B60K 2015/03528;
B60K 2015/03447; B60K 2015/03059;
B29C 66/53246; B29C 66/53247; B29C
66/72343; B62J 40/10; B62J 40/00; B62J
35/00; F02M 37/0082
See application file for complete search history.

(56) References Cited

U.S. PATENT DOCUMENTS

| | | | | |
|---|---|---|---|---|
| 4,909,434 | A * | 3/1990 | Jones | B29C 66/7392 220/258.2 |
| 2002/0011490 | A1* | 1/2002 | Nakamura | B29C 66/72343 220/4.12 |
| 2002/0063129 | A1 | 5/2002 | Potter et al. | |
| 2002/0195453 | A1* | 12/2002 | McLeod | B60K 15/03 220/562 |
| 2003/0044553 | A1* | 3/2003 | Ramanathan | B32B 1/02 428/35.8 |
| 2009/0101642 | A1* | 4/2009 | Muto | B62J 35/00 264/517 |
| 2010/0230415 | A1 | 9/2010 | Eulitz | |
| 2015/0239339 | A1* | 8/2015 | Nakamura | F16L 5/02 285/355 |
| 2016/0059477 | A1* | 3/2016 | Karsch | B29C 66/7392 156/242 |
| 2017/0028840 | A1* | 2/2017 | Coing | B60K 15/04 |
| 2018/0215252 | A1* | 8/2018 | Coing | B29C 49/20 |
| 2018/0243968 | A1* | 8/2018 | Aitken | B60K 15/03177 |

FOREIGN PATENT DOCUMENTS

| | | |
|---|---|---|
| JP | H08-53087 | 2/1996 |
| JP | 2001-113590 | 4/2001 |
| JP | 2002-192963 | 7/2002 |
| JP | 2009-101748 | 5/2009 |
| JP | 2013-043529 | 3/2013 |
| JP | 2013-095231 | 5/2013 |
| JP | 2016-068833 | 5/2016 |

OTHER PUBLICATIONS

Brazilian Office Action dated Sep. 27, 2022 issued in corresponding Brazilian application No. 112020008399-2; Partial English translation included (7 pages).

International Preliminary Report on Patentability, International Application No. PCT/JP2018/042467 dated Jun. 11, 2020, 9 pages.

Chinese Office Action dated Jul. 21, 2022 issued in corresponding Chinese Application No. 201880076048.7; English machine translation included (11 pages).

International Search Report, Date of mailing: Jan. 22, 2019, 2 pages.

Written Opinion of the International Searching Authority dated Jan. 22, 2019 filed in PCT/JP2018/042467, 5 pages.

German Office Action from Corresponding German Application No. 112018004480.7, dated May 10, 2023, 15 pages.

Hearing Notice dated Sep. 14, 2023 issued in corresponding Indian application No. 202047025248; English translation included (3 pages).

* cited by examiner

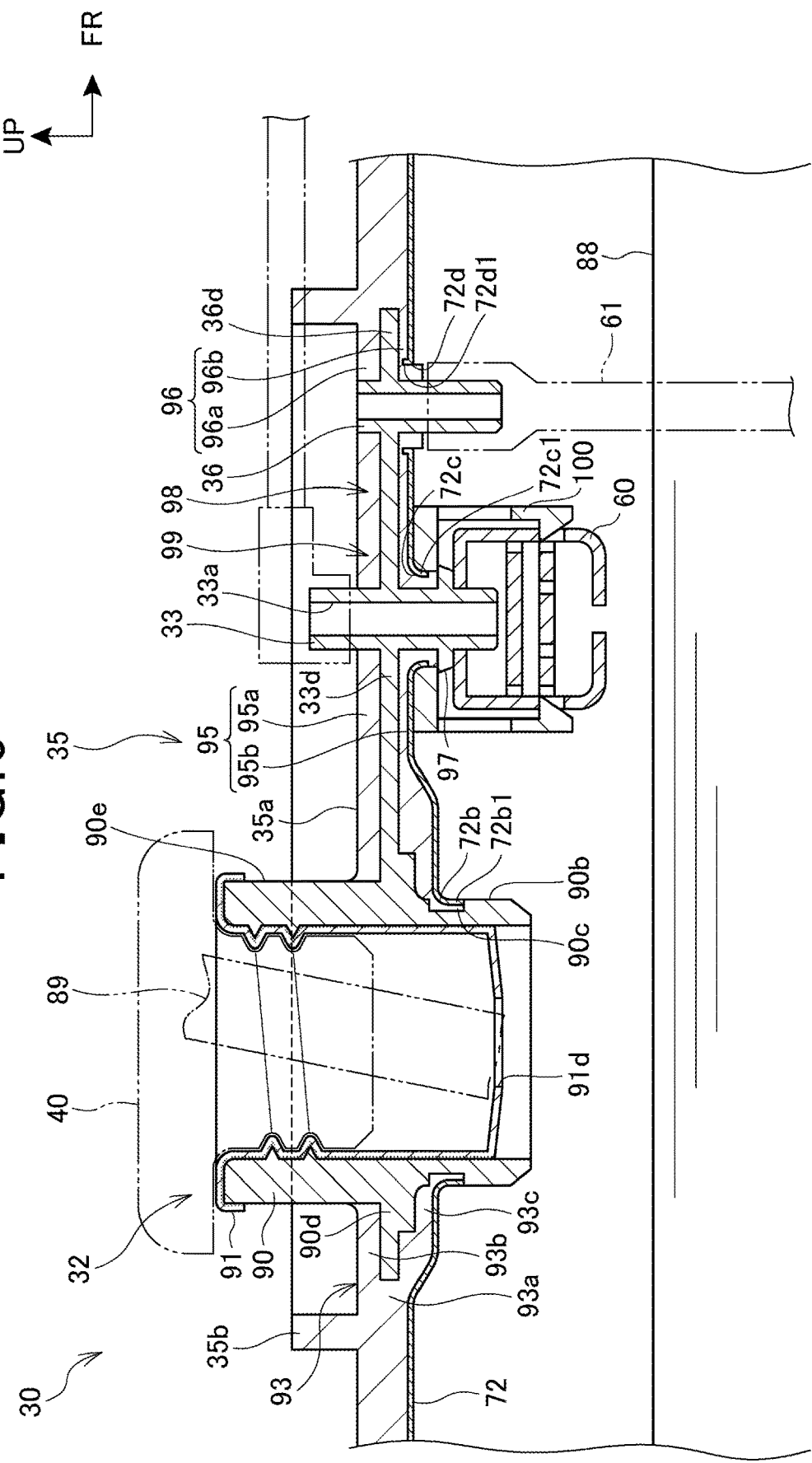

TANK MADE OF RESIN

TECHNICAL FIELD

The present invention relates to a tank made of resin, and particularly to a tank made of resin that has a barrier layer configured to reduce transmittance of a fuel and the like.

BACKGROUND ART

In a case in which a breather is provided in a tank made of resin, a pipe member that couples the inside of the tank with the outside of the tank is provided such that the pipe member allows the inside of the tank to communicate with the outside air via a gas-liquid separation part provided at an upper portion of the tank. According to Patent Literature 1, for example, a gas-liquid separation chamber is provided near a tank oil filling port, and a pipe member is opened in a gas layer chamber of the gas-liquid separation chamber for communication with an ambient air side from a bottom surface of a tank. Also, according to Patent Literature 2, a gas-liquid separation chamber is provided on an upper surface of the tank, and a pipe member is opened in a gas layer chamber of the gas-liquid separation chamber for communication with an ambient air side from aside surface of an upper portion of the tank through the inside of the tank.

CITATION LIST

Patent Literature

Patent Literature 1: Japanese Patent Laid-Open No. 2013-43529

Patent Literature 2: Japanese Patent Laid-Open No. 2013-95231

SUMMARY OF INVENTION

Technical Problem

In a case in which a breather is provided in a tank, as described above, a gas-liquid separation chamber is secured to a tank body, a mouth fitting of an oil filling port, and the like through welding or the like, and a pipe member is also bonded such that the pipe member penetrates through a hole provided in a wall surface of the tank body, which leads to a complicated structure. Since an installation area of a barrier layer decreases if the gas-liquid separation chamber and the pipe penetrating part are provided in a tank outer surface, in particular, there is a constraint of disposition of the gas-liquid separation chamber even in the tank made of resin in a case in which the tank is formed of a resin material and the barrier layer configured to suppress transmission of a fuel component and the like is provided. Therefore, disposition and a shape of the tank in a vehicle are constrained.

The present invention was made in view of the aforementioned circumstances, and an object is to provide a tank made of resin capable of enhancing freedom of a tank shape and improving an ease of installation in a vehicle body by improving freedom of disposition of a gas-liquid separation chamber and a breather pipe member.

Solution to Problem

The present specification includes entire content of Japanese Patent Application No. 2017-231015 filed on Nov. 30, 2017.

Also, the present specification includes entire content of Japanese Patent Application No. 2017-230929 filed on Nov. 30, 2017.

According to the present invention, there is provided a tank made of resin in which a tubular projection (33, 62, 133) projecting to an inside and an outside of a wall surface (41a, 42a) of a tank body (71, 73, 76, 171) that has a barrier layer (72, 74, 77, 172) is provided at the wall surface (41a, 42a), and an end edge (end edge part, edge) (72c1, 172c1) of the barrier layer (72, 74, 77, 172) is molded integrally with an outer peripheral resin part (95b, 209, 136) of the tubular projection (33, 62, 133).

According to the aforementioned invention, the outer peripheral resin part may be a thick part (209, 136) provided at a tank-side base (134) of the tubular projection (62, 133), and an edge (172c1) of an opening portion (hole) (74f, 172c) of the barrier layer (74, 172) may be disposed inside the thick part (209, 136).

Also, according to the aforementioned invention, the tubular projection (33) may be integrated with an insert resin member (90) of an oil filling port (32) and may be molded integrally with the tank body (71).

Also, according to the aforementioned invention, a securing part (100, 100') to and from which a gas-liquid separation chamber (60) is able to be attached and detached may be provided at the tubular projection (33, 133).

Also, according to the aforementioned invention, the securing part (100, 100') may have an attachment base (101, 101') that is larger than a width of an opening portion (hole) (72c, 172c) of the barrier layer (72, 172) and may be provided to cover the hole (72c, 172c) from an inside of the tank wall surface (41a).

Also, according to the aforementioned invention, the securing part (100, 100') may include a locking part (97) that is integrally formed at a position of the tubular projection (33, 133) projecting from the tank wall surface (41a) to the inside of the tank, and the securing part (100, 100') may be able to be engaged with an attachment base (101, 101') provided on a side of the gas-liquid separation chamber (60) via the locking part (97).

Also, according to the aforementioned invention, the tubular projection may be a piping coupling means (62) to which a piping member (61) is connected, the tank body (76) may have the barrier layer (77) configured to prevent transmission of a fuel, and the piping coupling means (62) may be integrally formed inside and outside the tank body (76) and the barrier layer (77) such that the piping coupling means (62) penetrates through the barrier layer (77).

Also, according to the aforementioned invention, the piping coupling means (62) may include a cylindrical part (109a) and a cylindrical cap tube (125) configured to be elastically fitted onto an outer periphery of the cylindrical part (109a), and the piping member (61) with flexibility may be connected to the cylindrical cap tube (125).

Also, according to the aforementioned invention, the tubular projection may be a piping coupling means (62) to which a piping member (61) is connected, the piping coupling means (62) may include a cylindrical part (109a), the tank body (76) may have the barrier layer (77) configured to prevent transmission of a fuel, the thick part may include a pair of flange parts (109b, 109c) sticking out of the cylindrical part (109a), and the piping coupling means (62) may be formed as an insert molded article at the tank body (76) with the barrier layer (77) sandwiched between the pair of flange parts (109b, 109c) and may be maintained in a liquid-tight state.

Also, according to the aforementioned invention, there is provided a tank made of resin in which a tank body (76) made of a resin may be formed by combining a pair of split bodies (71, 73), the piping coupling means (62) may be formed integrally with the tank body (76) using a resin such that the piping coupling means (62) penetrates through an inside and an outside of the tank body (76), and a device attachment port (67) may be provided at the tank body (76) such that the piping member (61) is able to be assembled from the device attachment port (67).

Also, according to the aforementioned invention, the device attachment port (67) may have a size with which the device attachment port (67) is covered with a device attachment member (68) configured to prevent transmission of a fuel and which the piping member (61) is able to be inserted into the device attachment port (67).

Also, according to the aforementioned invention, the piping member may be a drain tube (61) configured to be connected to the piping coupling means (62), the pair of split bodies (71, 73) may be included in a tank upper half body (41) that has an upper surface and a tank lower half body (42) that has a bottom surface, an upstream-side end of the drain tube (61) may be connected to the split body (71) on an upper side, and the piping coupling means (62) to which a downstream-side end of the drain tube (61) is connected may penetrate through a bottom wall (42a) of the tank body (76) and extend to the outside of the tank body (76).

Also, according to the aforementioned invention, the piping member (61) may be connected to an oil filling tray part (35) provided in a periphery of an oil filling port (32).

Advantageous Effects of Invention

In the tank made of resin according to the present invention, the tubular projection projecting to the inside and the outside of the wall surface of the tank body that has the barrier layer is provided at the wall surface, and the end edge of the barrier layer is molded integrally with the outer peripheral resin part of the tubular projection. According to the configuration, it is possible to reduce the hole formed in the barrier layer in size, to reduce influences on barrier performance, and to improve freedom of disposition of the tubular projection by molding the end edge of the barrier layer integrally with the outer peripheral resin part of the tubular projection.

According to the aforementioned invention, the outer peripheral resin part may be the thick part provided at the tank-side base of the tubular projection, and the edge of the hole of the barrier layer may be disposed inside the thick part. According to the configuration, it is possible to enhance attachment rigidity of the edge of the hole of the barrier layer and to improve durability due to the thick part of the tank-side base of the tubular projection.

Also, according to the aforementioned invention, the tubular projection may be integrated with the insert resin member of the oil filling port and may be molded integrally with the tank body. According to the configuration, it is possible to improve moldability of the tubular projection by integrating the tubular projection with the insert resin member of the oil filling port.

Also, according to the aforementioned invention, the securing part to and from which the gas-liquid separation chamber is able to be attached and detached may be provided at the tubular projection. According to the configuration, it is possible to simplify attachment of the gas-liquid separation chamber since the securing part to and from which the gas-liquid separation chamber is able to be attached and detached is provided at the tubular projection.

Also, according to the aforementioned invention, the securing part may have the attachment base that is larger than the width of the hole of the barrier layer and may be provided to cover the hole from the inside of the tank wall surface. According to the configuration, it is possible to protect the periphery of the hole of the barrier layer and to further improve durability since the peripheral portion of the hole of the barrier layer is covered from the inside.

Also, according to the aforementioned invention, the securing part may include the locking part that is integrally formed at the position of the tubular projection projecting from the tank wall surface to the inside of the tank, and the securing part may be able to be engaged with the attachment base provided on the side of the gas-liquid separation chamber via the locking part. According to the configuration, it is possible to attach a gas-liquid separation chamber using the locking part formed integrally with the tubular projection and thereby to simplify an attachment structure for the gas-liquid separation chamber.

Also, according to the aforementioned invention, the tubular projection may be the piping coupling means to which the piping member is connected, the tank body may have the barrier layer configured to prevent transmission of the fuel, and the piping coupling means may be integrally formed inside and outside the tank body and the barrier layer such that the piping coupling means penetrates through the barrier layer. According to the configuration, it is possible to reduce the hole formed in the barrier layer in size, to reduce influences on barrier performance, and to improve freedom of disposition of the piping coupling means by molding the end edge of the barrier layer integrally with the outer peripheral resin part of the piping coupling means. Also, it is possible to enhance attachment rigidity of the barrier layer and to improve durability. Further, it is possible to minimize a decrease in area of the barrier layer by the piping coupling means penetrating through the barrier layer.

Also, according to the aforementioned invention, since the piping coupling means includes the cylindrical part and the cylindrical cap tube configured to be elastically fitted onto the outer periphery of the cylindrical part, and the piping member with flexibility is connected to the cylindrical cap tube, a deflection reaction force is generated in the piping member fitted to the cylindrical cap tube, and it is thus possible to achieve a state in which the piping member is unlikely to fall off from the cylindrical cap tube.

Also, according to the aforementioned invention, since the tubular projection is the piping coupling means to which the piping member is connected, the piping coupling means includes the cylindrical part, the tank body has the barrier layer configured to prevent transmission of the fuel, the thick part includes the pair of flange parts sticking out of the cylindrical part, and the piping coupling means is formed as the insert molded article at the tank body with the barrier layer sandwiched between the pair of flange parts and is maintained in a liquid-tight state, it is possible to improve durability and liquid tightness of the barrier layer.

Also, according to the aforementioned invention, there is provided the tank made of resin in which the tank body made of a resin may be formed by combining the pair of split bodies, the piping coupling means may be formed integrally with the tank body using a resin such that the piping coupling means penetrates through the inside and the outside of the tank body, and the device attachment port may be provided at the tank body such that the piping member is able to be assembled from the device attachment port.

According to the configuration, it is possible to reduce the number of a piping coupling means, to easily assemble the piping member from the device attachment port after coupling the tank body in a case in which the tank body is split, and to reduce the number of operations for assembling the fuel tank.

Also, according to the aforementioned invention, since the device attachment port has the size with which the device attachment port is covered with the device attachment member configured to prevent transmission of the fuel and which the piping member is able to be inserted into the device attachment port, it is possible to prevent transmission of a fuel using the device attachment member by covering the device attachment port with the device attachment member configured to prevent the transmission of the fuel and to improve assembly properties of the fuel tank by allowing the device attachment port to have a size in which the piping member is accommodated.

Also, according to the aforementioned invention, since the piping member is the drain tube configured to be connected to the piping coupling means, the pair of split bodies are included in the tank upper half body that has the upper surface and the tank lower half body that has the bottom surface, the upstream-side end of the drain tube is connected to the split body on the upper side, and the piping coupling means to which the downstream-side end of the drain tube is connected penetrates through the bottom wall of the tank body and extends to the outside of the tank body, the drain tube is not exposed to the outside, and it is thus possible to improve an appearance.

Also, according to the aforementioned invention, since the piping member is connected to the oil filling tray part provided in the periphery of the oil filling port, the drain tube extending from the oil filling tray part in the periphery of the oil filling port does not appear from the tank upper surface, and it is thus possible to improve an appearance.

BRIEF DESCRIPTION OF DRAWINGS

FIG. 6 is an enlarged view of an oil filling tray part in FIG. 4.

FIG. 7A is an enlarged view of FIG. 6 and FIG. 7B is a diagram corresponding to a section along the line VII-VII in FIG. 7A.

DESCRIPTION OF EMBODIMENTS

Hereinafter, embodiments of the present invention will be described with reference to drawings. Also, description of directions such as front, back, left, right, up, and down in explanation are assumed to be the same as directions with respect to a vehicle body unless otherwise particularly indicated. In addition, the reference sign FR represented in each drawing indicates the front side of the vehicle body, the reference sign UP indicates the upper side of the vehicle body, and the reference sign LH indicates the left side of the vehicle body.

First Embodiment

Figure 1:
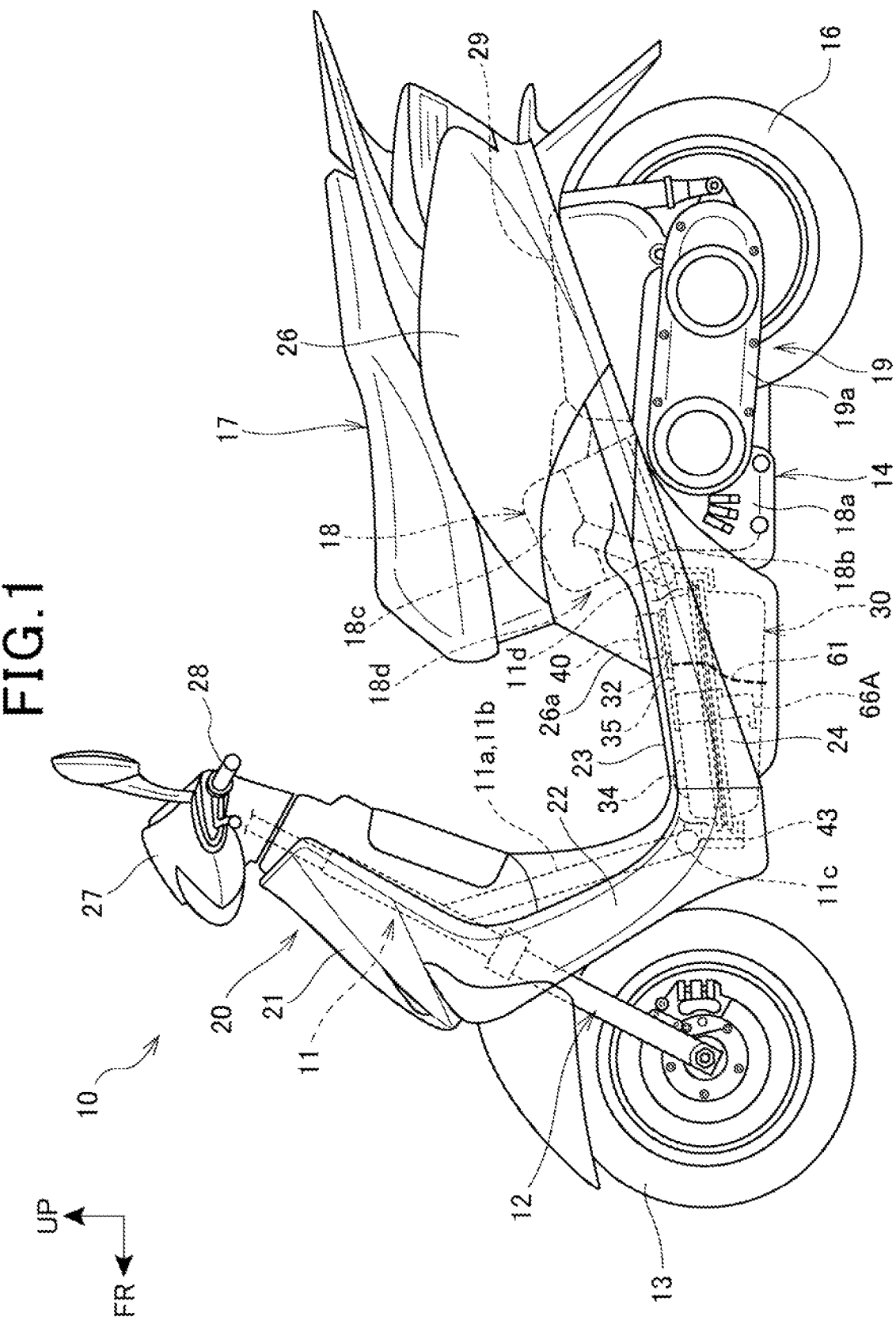
FIG. 1 is a left side view illustrating a motorcycle on which a fuel tank according to a first embodiment of the present invention is mounted.

FIG. 1 is a left side view illustrating a motorcycle 10 in which a fuel tank 30 according to an embodiment of the present invention is mounted.

The motorcycle 10 includes a vehicle body frame 11, a front wheel 13 supported at a front end of the vehicle body frame 11 via a front fork 12, and a back wheel 16 supported below the vehicle body frame 11 via a power unit 14.

The motorcycle 10 is a saddle-riding vehicle of a scooter type adapted such that a rider straddles and sits on a seat 17 disposed above the power unit 14 and the back wheel 16 and includes the vehicle body frame 11 and a vehicle body cover 20 that covers the periphery of the vehicle body frame 11.

The vehicle body cover 20 includes a front cover 21, a pair of left and right leg shields 22, a pair of left and right floor steps 23, a pair of left and right side skirts 24, a pair of left and right body covers 26, and a handle cover 27.

The front cover 21 covers the front side of the front fork 12. The left and right leg shields 22 are connected to edges of the front cover 21 on both sides and cover legs of the rider seated in the seat 17 from the front side. The left and right floor steps 23 extend backward from lower ends of the left and right leg shields 22 and serve as footrests for the rider. The left and right side skirts 24 respectively extend downward from edges of the left and right floor steps 23 on both sides. The left and right body covers 26 cover a lower side of the seat 17 on both sides. The handle cover 27 covers the center of a handle 28 attached to an upper portion of the front fork 12.

The power unit 14 is made up of an engine 18 that forms a front portion and a continuously variable transmission 19 provided integrally with a back portion of the engine 18. In the engine 18, a cylinder part 18d provided with a cylinder block 18b, a cylinder head 18c, and the like extends substantially upward from a crankcase 18a, and an intake device including an air cleaner 29 is connected to the cylinder head 18c. The continuously variable transmission 19 includes a transmission case 19a provided integrally with a back end of the crankcase 18a, and the back wheel 16 is attached to a back end of the transmission case 19a.

The fuel tank 30 is disposed below the left and right floor steps 23, and the periphery of the fuel tank 30 is covered with the vehicle body cover 20 including the floor steps 23, the side skirts 24, and the like.

The fuel tank 30 has a wedge shape, which is thin on the front side and is thick on the back side, in a side view. A canister 34 is disposed on the front side of the fuel tank 30, and an oil filling port (fuel oil filling port) 32 and a cap 40 that blocks the oil filling port 32 are disposed on the back side of the fuel tank 30. The cap 40 is covered with opening/closing lid (not illustrated) with a lock function for supplying a fuel that is provided at a center cover 26a that forms a front lower portion of the body cover 26. A flange 43 of the fuel tank 30 is attached to a plurality of cross frames 11c, and 11d bridged over a pair of left and right frame members 11a and 11b that are disposed below the left and right floor steps 23. The pair of left and right frame members 11a and 11b and the plurality of cross frames 11c and 11d form a part of the vehicle body frame 11.

Although a structure in which an opening 67 is provided in a bottom wall 42a of a lower half body 42 of the fuel tank 30 and a fuel pump 66 is attached to the edge of the opening 67 is illustrated in FIGS. 2 to 8 described below, an opening may be provided in an upper wall 41a of an upper half body 41 of the fuel tank 30, and a fuel pump 66A may be attached to the edge of the opening as illustrated in FIG. 1.

Figure 2:
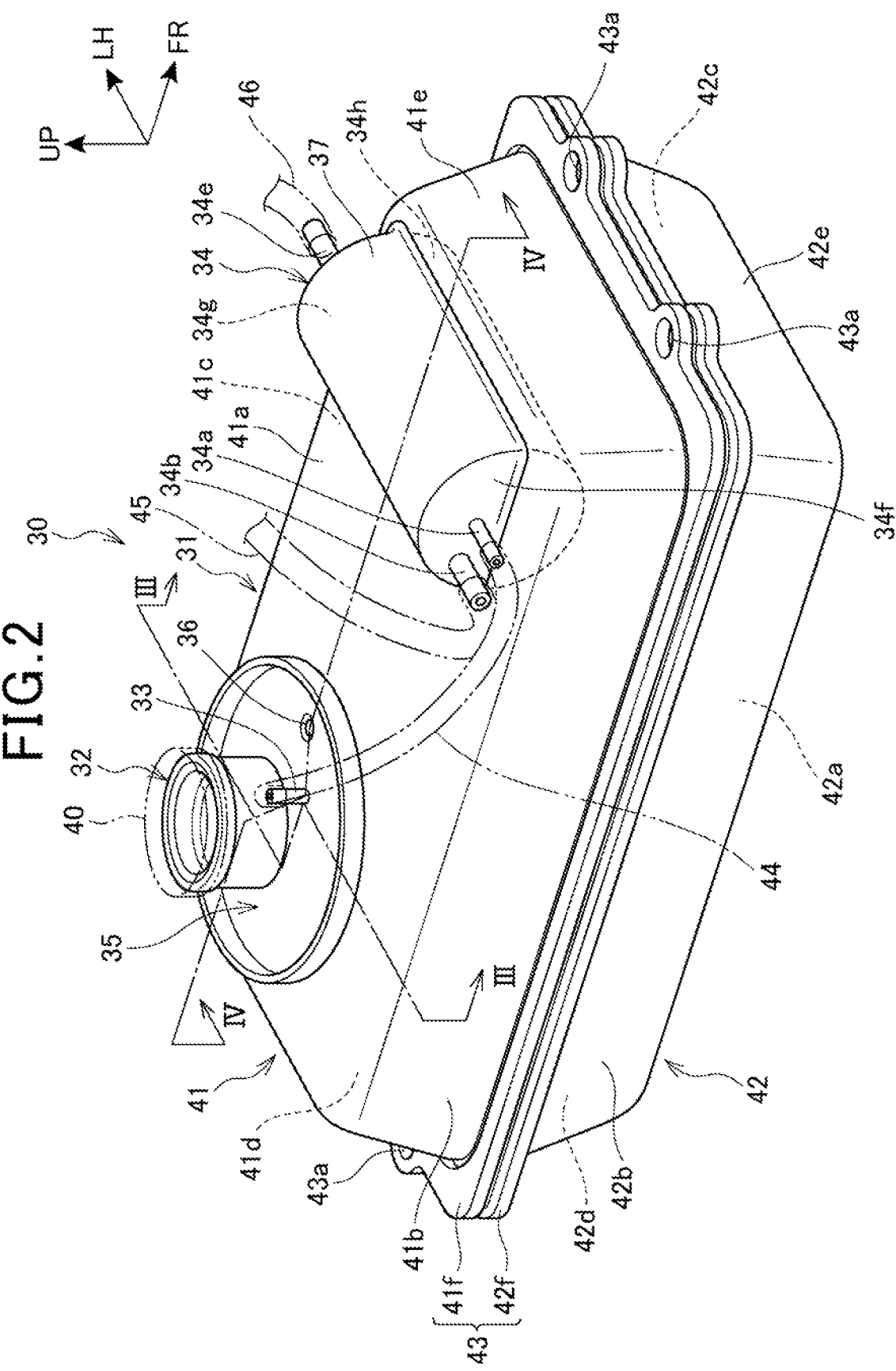
FIG. 2 is a diagram schematically illustrating the fuel tank.

FIG. 2 is a diagram schematically illustrating the fuel tank 30.

The fuel tank (tank made of resin) 30 includes a tank main part 31 that forms a main part that accommodates a fuel, the oil filling port 32 for pouring the fuel into the tank main part 31, a breather pipe 33 capable of ejecting an evaporated fuel in the tank main part 31 to the outside, the canister 34 provided integrally with a tank upper portion, an oil filling tray part 35 provided at the tank upper portion, and an upper drain pipe 36 configured to discharge a fuel spilt to the oil filling tray part 35.

The tank main part 31 includes the upper half body 41 with a container shape opened downward and the lower half body 42 with a container shape opened upward. The upper half body 41 and the lower half body 42 are respectively made of a resin.

The upper half body 41 includes the upper wall 41a, side walls 41b, 41c, 41d, and 41e extending downward from peripheral edges of the upper wall 41a and having both edges connected to each other, and an upper flange 41f formed over lower ends of the side walls 41b, 41c, 41d, and 41e.

The lower half body 42 includes the bottom wall (tank wall surface) 42a, side walls 42b, 42c, 42d, and 42e standing up from peripheral edges of the bottom wall 42a and having both edges connected to each other, and a lower flange 42f formed over upper ends of the side walls 42b, 42c, 42d, and 42e.

The upper flange 41f and the lower flange 42f are welded in an overlapping manner on the upper and lower sides. The upper flange 41f and the lower flange 42f form the flange 43 of the fuel tank 30.

A plurality of attachment holes 43a are formed in the flange 43, and the flange 43 is attached to the cross frames 11c and 11d (see FIG. 1) using fastening members such as bolts, nuts, or the like that are caused to pass through the plurality of attachment holes 43a.

The oil filling port 32 penetrates through the upper wall 41a, and the fuel is supplied to the inside of the fuel tank 30 via the oil filling port 32. The oil filling port 32 is blocked with the cap 40 screwed into the oil filling port 32.

The canister 34 allows an adsorbent (activated carbon) to adsorb the evaporated fuel in the fuel tank 30, and then causes the activated carbon to discharge the evaporated fuel by further taking new air to supply the evaporated fuel to an intake pipe of the engine 18 (see FIG. 1) of the vehicle.

A charge port 34a and a purge port 34b are provided at one end 34f of the canister 34 in a longitudinal direction.

The charge port 34a is connected to the breather pipe 33 via a charge pipe 44. The charge port 34a is a portion through which the evaporated fuel in the fuel tank 30 is taken into the canister 34.

The purge port 34b is connected to the intake pipe (not illustrated) of the engine 18 (see FIG. 1) via a purge pipe 45. The purge port 34b is a portion through which the evaporated fuel is discharged to the intake device of the engine 18.

A new air introduction port 34e projects from the other end 34g of the canister 34 in the longitudinal direction. An end of a new air introduction pipe 46 is connected to the new air introduction port 34e. The other end of the new air introduction pipe 46 is opened to the ambient air, and new air is introduced into the canister 34 via the new air introduction pipe 46 and the new air introduction port 34e.

Figure 3:
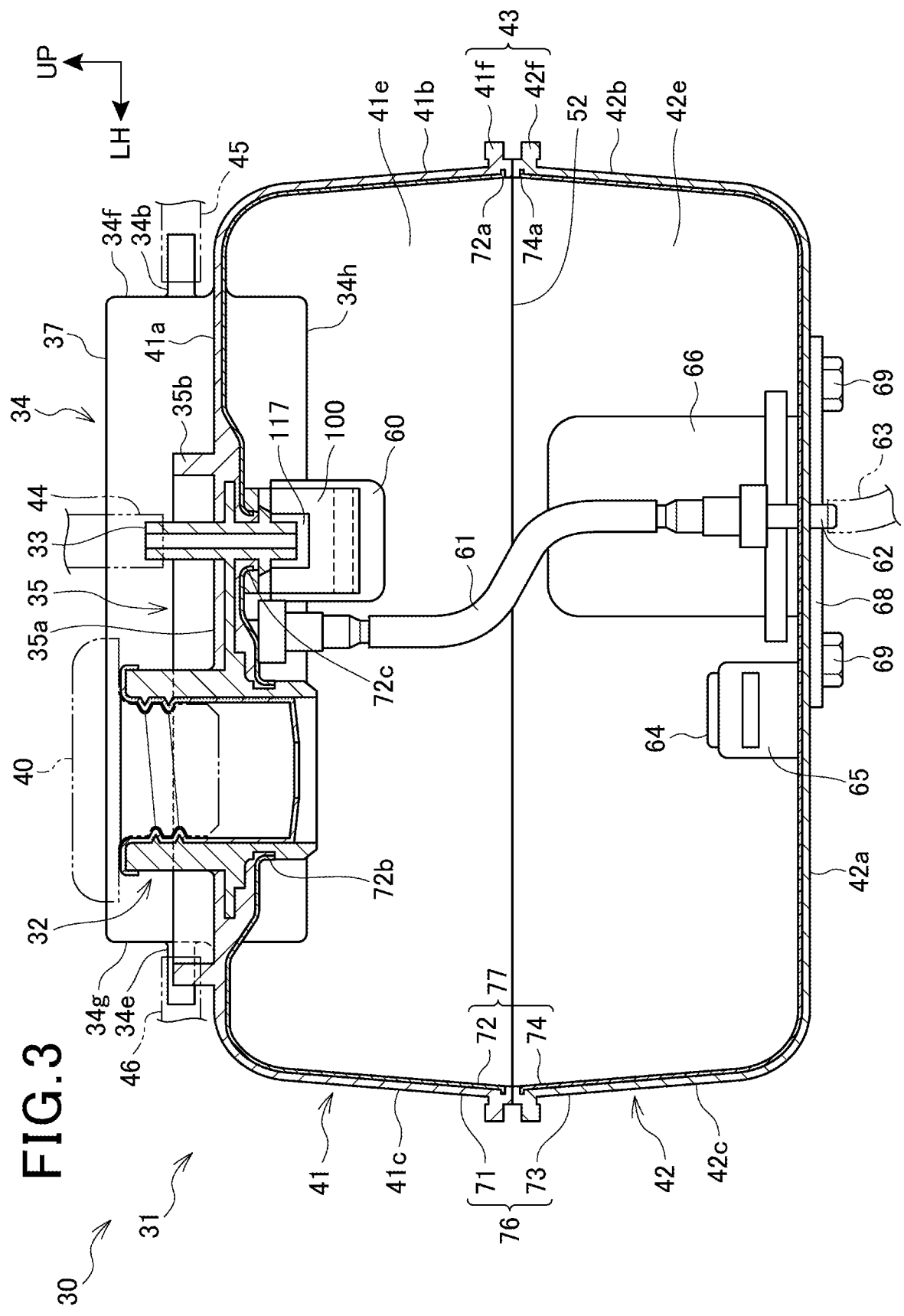
FIG. 3 is a sectional view along the line III-III in FIG. 2.
Figure 4:
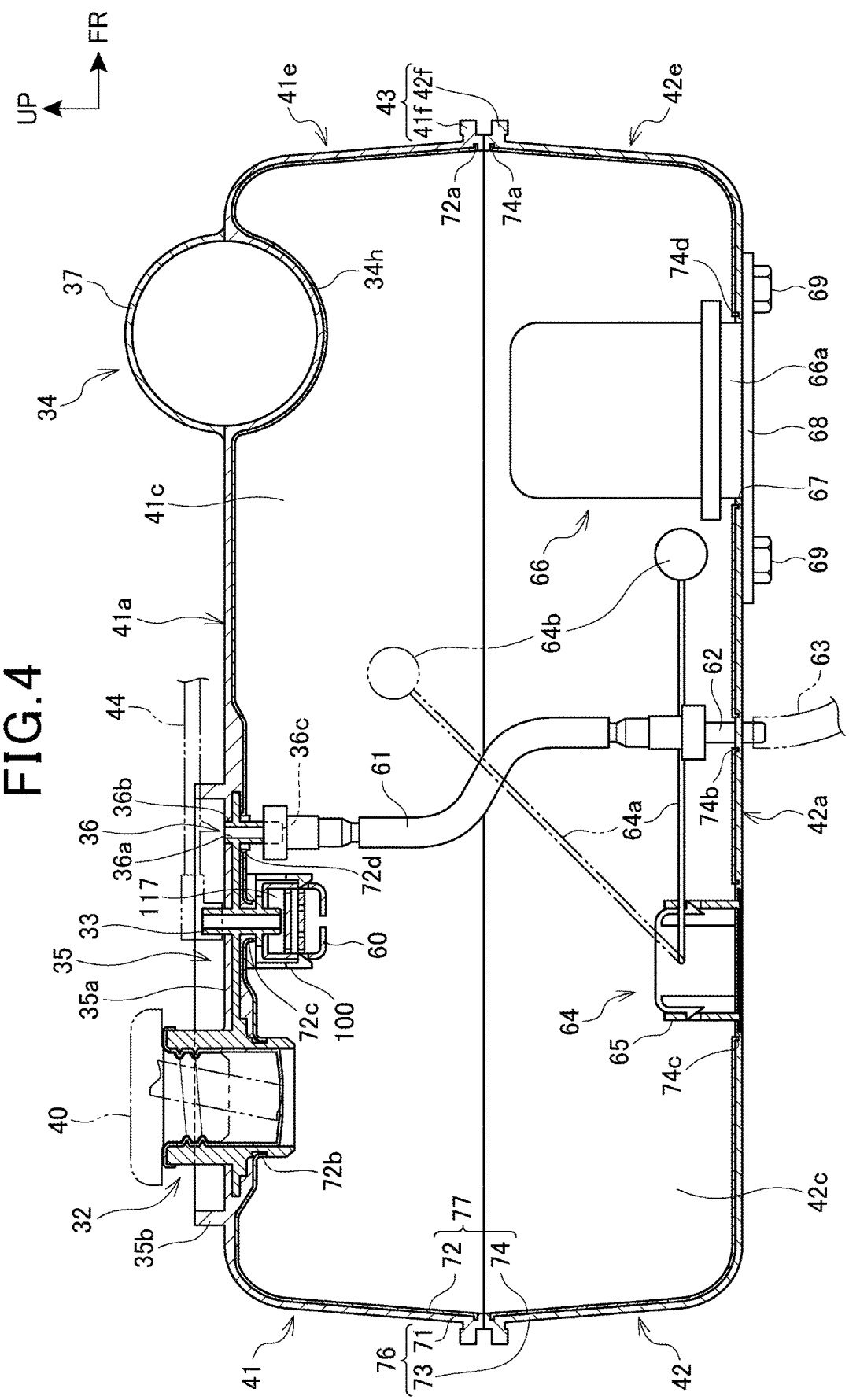
FIG. 4 is a sectional view along the line IV-IV in FIG. 2.

FIG. 3 is a sectional view along the line III-III in FIG. 2, and FIG. 4 is a sectional view along the line IV-IV.

The breather pipe 33 is provided in the upper wall 41a of the upper half body 41 at an interval from the oil filling port 32. The breather pipe 33 is formed into a cylindrical shape extending in the up-down direction. The breather pipe 33 penetrates through the upper wall (tank wall surface) 41a in the up-down direction. A gas-liquid separation unit 60 is detachably supported at a lower end of the breather pipe 33 via a holder 100. The gas-liquid separation unit 60 separates a liquid fuel mixed into the evaporated fuel. A gas layer chamber 117 in which a lower end opening of the breather pipe 33 is disposed is provided at an upper portion of the gas-liquid separation unit 60. The evaporated fuel, from which the liquid fuel has been separated by the gas-liquid separation unit 60, is fed from the gas layer chamber 117 to the canister 34 through the breather pipe 33 and the charge pipe 44.

The oil filling tray part 35 is formed in the outer peripheral portion of the oil filling port 32 and the breather pipe 33. The oil filling tray part 35 includes a circular bottom 35a formed in the outer peripheral portion of the oil filling port 32 and an outer peripheral wall 35b with a standing wall shape formed in the periphery of the bottom 35a. The fuel spilt to the bottom 35a is held in the oil filling tray part 35 by the outer peripheral wall 35b.

As illustrated in FIG. 4, the canister 34 is made up of a semi-cylindrical accommodation recessed part 34h recessed toward the inside of the tank in the upper wall 41a and a semi-cylindrical cover 37 configured to cover the semi-cylindrical accommodation recessed part 34h from the upper side in a tightly closed manner and accommodates the adsorbent configured to adsorb the evaporated fuel inside the canister 34.

The upper drain pipe 36 is disposed at the bottom 35a of the oil filling tray part 35. The upper drain pipe 36 is formed into a cylindrical shape extending in the up-down direction. The upper drain pipe 36 has an upper end 36b disposed in the same plane as the bottom 35a of the oil filling tray part 35, and a drain hole 36a is opened at the upper end 36b of the upper drain pipe 36.

A lower end 36c of the upper drain pipe 36 is disposed inside the fuel tank 30. A drain tube 61 is connected to the lower end 36c of the upper drain pipe 36. The drain tube 61 extends downward and is connected to the lower drain pipe 62 provided at the lower half body 42. The lower drain pipe 62 penetrates through the bottom wall 42a of the lower half body 42. A lower drain tube 63 is connected to the lower end of the lower drain pipe 62. A downstream end of the lower drain tube 63 is disposed at a lower portion of the vehicle body, and the fuel spilt to the oil filling tray part 35 can be discharged to the outside of the fuel tank 30 through the lower drain tube 63.

A level meter 64 and a fuel pump 66 are disposed in the bottom wall 42a of the fuel tank 30.

The level meter 64 is locked at a locking member 65 provided in the bottom wall 42a. The level meter 64 includes a built-in detection unit (not illustrated), an arm 64a attached to a rotation shaft (not illustrated) rotatably provided at the detection unit, and a float 64b attached to a distal end of the arm 64a. The float 64b floating in the fuel moves up and down and the arm 64a rotates with an increase and a decrease in fuel in the fuel tank 30. The detection unit of the level meter 64 detects a rotation angle of the arm 64a in accordance with a liquid surface position of the fuel and sends the rotation angle to an Electronic Control Unit (ECU) (not illustrated).

The fuel pump 66 is inserted into the fuel tank 30 through the opening 67 provided in the bottom wall 42a. A pump lower portion 66a provided at a lower portion of the fuel pump 66 is fastened with an inert nut (not illustrated) and is secured to the bottom wall 42a using a bolt 69 via an attachment plate 68 made of metal. The fuel pump 66 supplies the fuel in the fuel tank 30 to the engine 18.

As illustrated in FIGS. 3 and 4, the upper half body 41 includes a tank body 71 on the upper side made of a resin and a barrier layer 72 on the upper side provided over substantially the entire inner surface of the tank body 71 on the upper side.

The barrier layer 72 is adapted to suppress transmission of the fuel to the outside of the fuel tank 30. The barrier layer 72 is a shaped article shaped into a tank shape and is formed substantially along the tank outer shape. The thickness of the barrier layer 72 is substantially constant over the entire barrier layer 72.

An opening portion (hole) 72a is formed at an end of the barrier layer 72 on the upper side in accordance with the shape of the opened end of the tank body 71. Also, the oil filling port 32, the breather pipe 33, and in accordance with the position of the upper drain pipe 36, opening portions (holes) 72b, 72c, and 72d are formed in the barrier layer 72 on the upper side. End edges of the opening portions 72a to 72d are buried in the resin of the tank body 71 such that the barrier layer 72 on the upper side is unlikely to roll up.

The lower half body 42 of the tank main part 31 includes a tank body 73 on the lower side made of a resin and the barrier layer 74 on the lower side provided substantially over the entire inner surface of the tank body 73 on the lower side. The thickness of the barrier layer 74 is substantially constant over the entire barrier layer 74.

An opening portion 74a is formed at an end of the barrier layer 74 on the lower side in accordance with the shape of the opened end of the tank body 73. Also, the lower drain pipe 62, the level meter 64, and in accordance with the position of the fuel pump 66, the opening portions 74a, 74b, 74c, and 74d are formed in the barrier layer 74 on the lower side. End edges of the opening portions 74a to 74d are buried in the resin of the tank body 73 such that the barrier layer 74 on the lower side is unlikely to roll up.

The tank bodies 71 and 73 form the tank body 76 of the fuel tank 30. Also, the barrier layers 72 and 74 form a barrier layer 77 of the fuel tank 30.

As illustrated in FIG. 4 described above, since the drain tube 61 that serves as a piping member is connected to the oil filling tray part 35 provided in the periphery of the oil filling port 32 that serves as the fuel oil filling port, the drain tube 61 extending from the oil filling tray part 35 in the periphery of the oil filling port 32 does not appear from the tank upper surface, and it is thus possible to improve an appearance.

Figure 5:
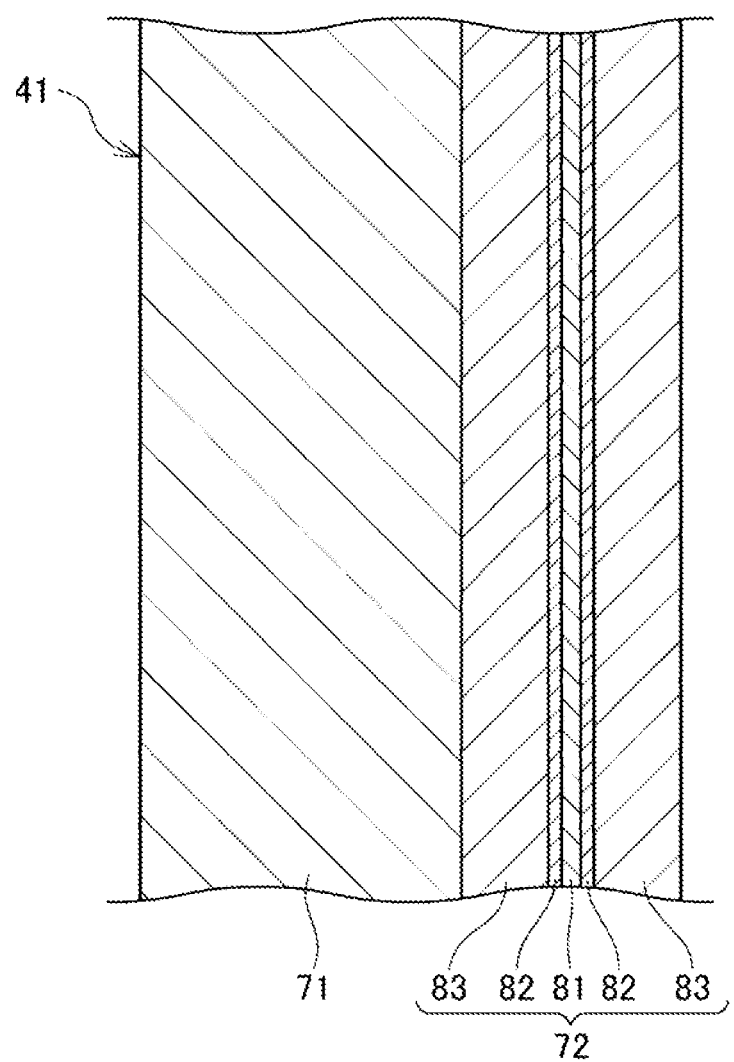
FIG. 5 is a sectional view illustrating a tank body and a barrier layer in an upper half body.

FIG. 5 is a sectional view illustrating the tank body 71 and the barrier layer 72 in the upper half body 41.

The upper half body 41 is made up of a total of six layers including one layer of tank body 71 and five layers of barrier layers 72.

The barrier layer 72 includes a barrier layer body 81, adhesive layers 82 and 82 provided on both surfaces of the barrier layer body 81, and outer layers 83 and 83 bonded to the barrier layer body 81 on both sides via the adhesive layers 82 and 82.

A material of the tank body 71 is high-density polyethylene (HDPE) in one example.

The barrier layer body 81 is for reducing transmission of the fuel and the like and is made of a material through which the fuel and the like are more unlikely to penetrate than high-density polyethylene. The barrier layer body 81 is made of an ethylene vinyl alcohol copolymer (EVOH) in one example.

The outer layers 83 and 83 are made of a material that is the same as the material of the tank body 71 and is made of high-density polyethylene in one example.

The barrier layer 72 is coupled to the inner surface of the tank body 71 via the outer layer 83 on the side of the tank body 71. Since the barrier layer 72 is coupled to the inner surface of the tank body 71 via the outer layer 83 of the same material as the material of the tank body 71, the barrier layer 72 is fixedly coupled to the tank body 71 with high adhesiveness with respect to the tank body 71.

The outer layer 83 of the barrier layer 72 is exposed to the inside of the tank body 71 and is brought into contact with the fuel. Therefore, direct contact of the fuel with the barrier layer body 81 is prevented.

A layer structure of the lower half body 42 (see FIG. 3) is similar to the layer structure of the upper half body 41, a layer structure of the tank body 73 on the lower side (see FIG. 3) is the same as the layer structure of the tank body 71 on the upper side, and a structure of the barrier layer 74 on the lower side (see FIG. 3)*is* the same as the structure of the barrier layer 72 on the upper side.

FIG. 6 is an enlarged view of the oil filling tray part 35 in FIG. 4.

The oil filling port 32, the breather pipe (tubular projection) 33, and the upper drain pipe 36 are provided at the oil filling tray part 35. The reference sign 88 represents a liquid surface of the fuel.

The oil filling port 32 includes an oil filling port tubular part (insert resin member) 90 for pouring the fuel. A flange part 90d is formed at a lower portion (base) of the oil filling port tubular part 90. The flange part 90d is formed into a plate shape spreading outward in a radial direction from the outer peripheral portion of the oil filling port tubular part 90. The oil filling port tubular part 90 and the flange part 90d are made of the same resin material as the resin material of the tank body 71. The oil filling port tubular part 90 is molded integrally with the tank body 71 in a state in which the flange part 90d is casted and incorporated in the resin of the tank body 71.

The tank body 71 includes a thick part 93 formed in accordance with the position of the oil filling port 32. The thick part 93 includes a thick plate part 93a located outward in the radial direction, an upper plate part 93b that is thinner than the thick plate part 93a and is formed at an upper end of the thick plate part 93a, and a lower plate part 93c that is thinner than the thick plate part 93a and is formed at a lower end of the thick plate part 93a. The upper plate part 93b forms the bottom 35a of the oil filling tray part 35. The lower plate part 93c sticks out to the inside of the tank body 71. The flange part 90d of the oil filling port tubular part 90 is sandwiched between the upper plate part 83b and the lower plate part 93c.

A mouth fitting member 91 made of metal is supported at the oil filling port tubular part 90. The mouth fitting member 91 extends further inward (downward) than the opening portion 72b of the barrier layer 72 along an inner peripheral surface of the oil filling port tubular part 90. A female screw part (attachment part) is formed in the inner peripheral surface of the mouth fitting member 91. A male screw part of the cap 40 is screwed into and coupled to the female screw part. A disk-shaped restriction part is formed at a lower end of the mouth fitting member 91 to restrict downward entrance of a fuel nozzle 89. A supply hole 91d with a long hole shape that is elongated in the left-side direction is formed at the center of the restriction part. The fuel is supplied from the fuel nozzle 89 into the fuel tank 30 through the supply hole 91d.

The opening portion 72b of the barrier layer 72 is formed into a circular shape. An end edge part (end edge) 72b1 bent downward is formed at the opening portion 72b along the edge of the opening portion 72b. The end edge part 72b1 enters a recessed groove 90c provided in a lower outer peripheral surface 90b of the oil filling port tubular part 90. Since the end edge part 72b1 is secured in a state in which the end edge part 72b1 has entered the recessed groove 90c, it is possible to more fixedly protect the end edge of the barrier layer 72. The lower outer peripheral surface 90b of the oil filling port tubular part 90 is formed to have a smaller diameter than a diameter of an upper outer peripheral surface 90e of the oil filling port tubular part 90.

The breather pipe 33 projects further downward than the opening portion 72c of the barrier layer 72 through the opening portion 72c of the barrier layer 72. The breather pipe 33 includes a communication hole 33a and establishes communication between the inside and the outside of the tank body.

A flange part 33d is formed at a lower portion (base) of the breather pipe 33. The flange part 33d is formed into a plate shape spreading outward in the radial direction form the outer peripheral portion of the breather pipe 33. The breather pipe 33 and the flange part 33d are made of the same resin material as the resin material of the tank body 71. The breather pipe 33 and the tank body 71 are integrally molded in a state in which the flange part 33d is casted and incorporated in the resin of the tank body 71.

The tank body 71 includes a support resin part (outer peripheral resin part) 95 at the outer peripheral portion of the breather pipe 33. The support resin part 95 includes an upper plate part 95a extending from the upper plate part 93b of the thick part 93 and a lower plate part 95b extending from the lower plate part 93c of the thick part 93. The flange part 33d of the breather pipe 33 is sandwiched between the upper plate part 95a and the lower plate part 95b. The upper plate part 95a forms the bottom 35a of the oil filling tray part 35.

The opening portion 72c of the barrier layer 72 is formed into a circular shape. An end edge part (end edge) 72c1 bent downward is formed at the opening portion 72c along the edge of the opening portion 72c. The end edge part 72c1 is located further outward in the radial direction than the breather pipe 33.

The upper drain pipe 36 projects further downward than the opening portion 72d of the barrier layer 72 through the opening portion 72d of the barrier layer 72.

A flange part 36d is formed at a lower portion (base) of the upper drain pipe 36. The flange part 36d is formed into a plate shape spreading outward in the radial direction from the outer peripheral portion of the upper drain pipe 36.

The upper drain pipe 36 and the flange part 36d are made of the same resin material as the resin material of the tank body 71. The flange part 36d is casted and incorporated in the resin of the tank body 71, and the upper drain pipe 36 and the tank body 71 are integrally molded.

The tank body 71 includes a support resin part 96 at the outer peripheral portion of the upper drain pipe 36. The support resin part 96 includes an upper plate part 96a extending from the upper plate part 95a of the support resin part 95 and a lower plate part 96b extending from the lower plate part 95b of the support resin part 95. The flange part 36d of the upper drain pipe 36 is sandwiched between the upper plate part 96a and the lower plate part 96b. The upper plate part 96a forms the bottom 35a of the oil filling tray part 35.

The opening portion 72d at the position of the upper drain pipe 36 in the barrier layer 72 is formed into a circular shape. An end edge part (end edge) 72d1 bent upward is formed at the opening portion 72d along the edge of the opening portion 72d. The end edge part 72d1 is incorporated inside the resin of the lower plate part 96b of the support resin part 96.

The oil filling port tubular part 90, the breather pipe 33, and the upper drain pipe 36 are integrally molded with a resin. Therefore, the respective flange parts 90d, 33d, and 36d form a single plate-shaped member 98. The mouth fitting member 91 is insert-molded at the oil filling port tubular part 90, and the oil filling port 32, the breather pipe 33, and the upper drain pipe 36 form an integrally molded article 99. The integrally molded article 99 is insert-molded at the tank body 71.

Figure 7A:
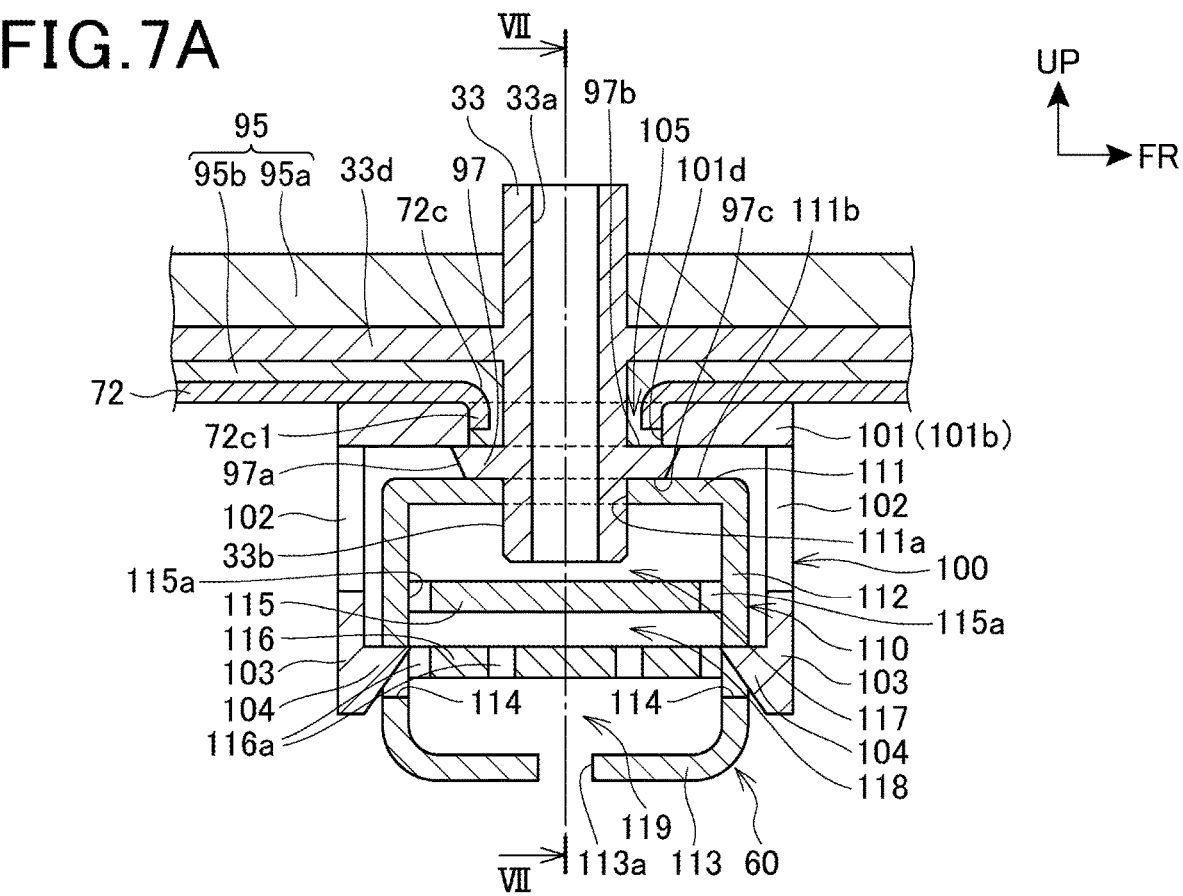
FIGS. 7A and 7B are explanatory diagrams of a breather pipe and a gas-liquid separation unit, where
Figure 7B:
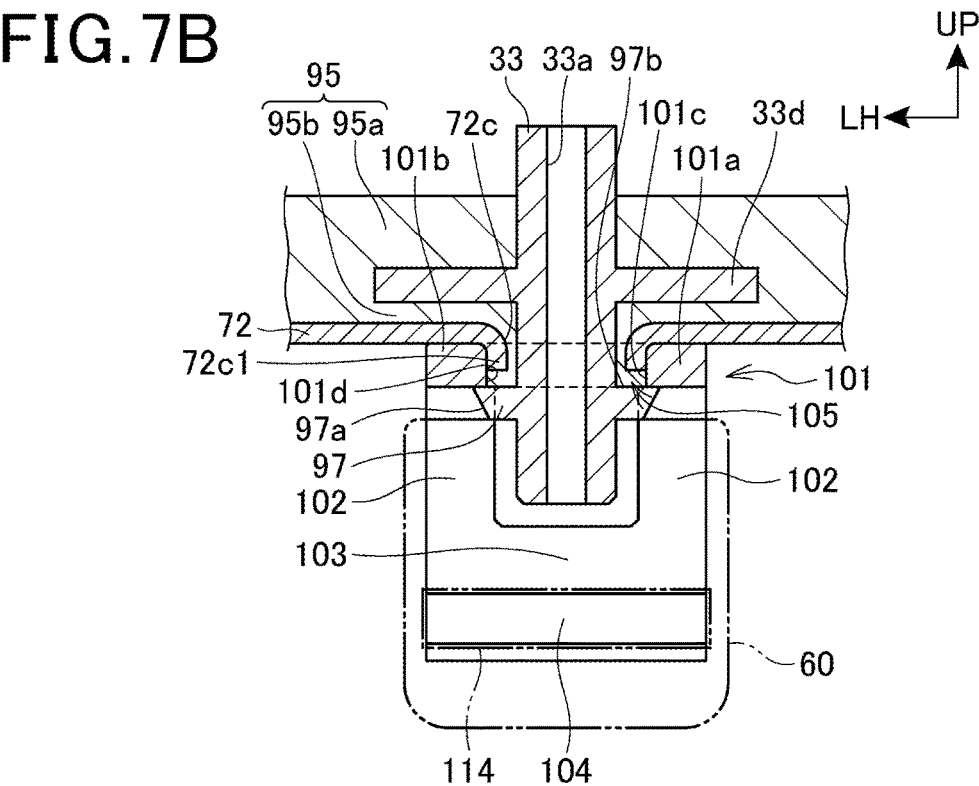

FIGS. 7A and 7B are explanatory diagrams of the breather pipe 33 and the gas-liquid separation unit 60, where FIG. 7A is an enlarged view of FIG. 6 and FIG. 7B is a diagram corresponding to the section along the line VII-VII in FIG. 7A. In FIG. 7B, the gas-liquid separation unit 60 is illustrated by the two-dotted dashed line.

A tapered flange part (locking part) 97 is formed at a lower portion of the breather pipe 33. The tapered flange part 97 is integrated with the breather pipe 33 and is formed using a resin that is similar to the resin of the breather pipe 33. The tapered flange part 97 is formed into an annular plate shape. An outer peripheral portion 97a of the tapered flange part 97 is further inclined inward in the radial direction toward the lower side. The outer peripheral portion 97a elastically deforms the holder 100 in a case in which the holder (securing part) 100 is attached from the lower side.

The holder 100 is formed to have an appearance with a rectangular parallelepiped shape. The holder 100 includes an attachment base 101 with a square shape supported at the tapered flange part 97, stretching parts 102 extending downward from four corners of the attachment base 101, coupling parts 103 provided at lower ends of the stretching parts 102, and claw parts 104 formed at the coupling parts 103. The claw parts 104 are detachably held by the gas-liquid separation unit (gas-liquid separation chamber) 60.

As illustrated in FIG. 7B, the attachment base 101 includes a pair of left and right base half bodies 101a and 101b. The base half bodies 101a and 101b are formed symmetrically on the left and right sides and are disposed on mutually opposite sides with the breather pipe 33 sandwiched therebetween. The holder 100 is supported at the tapered flange part 97 in a state in which the base half bodies 101a and 101b are brought into contact with the lower plate part 95b of the tank body 71 and are brought into contact with the upper surface 97b of the tapered flange part 97.

Notches 101c and 101d are formed in the base half bodies 101a and 101b at portions facing the breather pipe 33. The notches 101c and 101d are formed into semi-arc shapes. The diameter of the notches 101c and 101d is larger than the outer diameter of the breather pipe 33 and is smaller than the outer diameter of the tapered flange part 97. A hole 105 with an arc shape is configured in the attachment base 101 by causing the notches 101c and 101d to face each other, and the breather pipe 33 is disposed in the hole 105. The end edge part 72c1 of the barrier layer 72 and the lower plate part 95b enter a portion between the breather pipe 33 and the base half bodies 101a and 101b in the hole 105. The attachment base 101 of the holder 100 is disposed outward in the radial direction with respect to the end edge part 72c1. Since a peripheral portion of the opening portion 72c of the barrier layer 72 is covered with the attachment base 101 from the inside (lower side), it is possible to protect the periphery of the opening portion 72c of the barrier layer 72, such as the end edge part 72c1 of the barrier layer 72, and to further improve durability.

The respective stretching parts 102 are formed symmetrically on the left and right sides. The stretching parts 102 are formed into square shapes and have different elastic forces in the front-back direction and the left-right direction.

The coupling parts 103 extending in the left-right direction are formed at the lower ends of the two stretching parts 102 on the front side and the back side. The claw parts 104 projecting inward in the front-back direction are formed inward in the front-back direction of the coupling parts 103. The gas-liquid separation unit 60 is hooked and supported at the claw parts 104.

In a case in which the holder 100 is attached to the breather pipe 33, the breather pipe 33 is caused to enter the hole 105 of the attachment base 101, and the holder 100 is caused to move upward. The tapered flange part 97 elastically deforms the stretching parts 102 in the left-right direction, and the attachment base 101 of the holder 100 is hooked at (engaged with) and attached to the tapered flange part 97. On the other hand, it is possible to attach and detach the gas-liquid separation unit 60 to and from the claw parts 104 by elastically deforming the stretching parts 102 in the front-back direction according to the holder 100. It is possible to differently use elastic forces in a plurality of directions by the stretching parts 102 having rectangular parallelepiped shapes.

The gas-liquid separation unit 60 includes a casing 110 with a box shape. The casing 110 is formed into a hollow shape and includes an upper wall 111, a side wall 112 extending downward from an outer peripheral edge of the upper wall 111, and a bottom wall 113 formed at a lower end of the side wall 112. A pair of left and right attachment/detachment holes 114 are formed in the side wall 112 of the casing 110. The claw parts 104 of the holder 100 enter the attachment/detachment holes 114, and the gas-liquid separation unit 60 is supported at the holder 100. The gas-liquid separation unit 60 is attached via the holder 100 attached to the tapered flange part 97 that is formed integrally with the breather pipe 33. Therefore, it is possible to simplify an attachment structure of the gas-liquid separation unit 60.

An insertion hole 111a penetrating the up-down direction is formed at an upper portion of the upper wall 111. The diameter of the insertion hole 111a is formed in correspondence to the outer diameter of a lower end 33b of the breather pipe 33. The lower end 33b of the breather pipe 33 is inserted into the insertion hole 111a. Communication is established between the inside of the casing 110 and the outside of the fuel tank 30 through the communication hole 33a of the breather pipe 33. The casing 110 is positioned by the lower end of the breather pipe 33 being inserted into the insertion hole 111a.

An upper surface 111b of the upper wall 111 is in contact with a lower surface 97c of the tapered flange part 97. Since the upper surface 111b of the upper wall 111 is in surface contact with the lower surface 97c of the tapered flange part 97, the insertion hole 111a is tightly closed. Instead of the surface contact, a sealing member may be disposed on either the upper surface 111b of the upper wall 111 or the lower surface 97c of the tapered flange part 97.

A pair of upper and lower partitioning plates 115 and 116 are supported inside the casing 110, and a plurality of through-holes 115a and 116a are formed in the respective partitioning plates 115 and 116. The inside of the casing 110 is partitioned into three spaces 117, 118, and 119 with the partitioning plates 115 and 116, and the respective spaces 117, 118, and 119 communicate with each other through the through-holes 115a and 116a. A liquid returning hole 113a penetrating in the up-down direction is formed in the bottom wall 113, and communication is established between a space 119 inside the casing 110 and a space inside the fuel tank 30.

The evaporated fuel and the liquid fuel enter the casing 110 of the gas-liquid separation unit 60 in a mixed manner via the liquid returning hole 113a or the like. The liquid fuel is separated from the evaporated fuel when the fuel that has entered the casing is directed toward the upper space (gas layer chamber) 117 via the through-holes 116a and 115a. The evaporated fuel that has entered the upper space 117 passes through the breather pipe 33 and is fed to the canister 34 through the charge pipe 44.

The gas-liquid separation unit 60 according to the embodiment can be replaced.

As illustrated in FIG. 4, if the fuel pump 66 is detached, the gas-liquid separation unit 60 can be accessed from the opening 67 since the opening 67 is opened. Therefore, the gas-liquid separation unit 60 is easily replaced by operating the holder 100 from the opening 67 and taking in and out the gas-liquid separation unit 60 via the opening 67.

Figure 8:
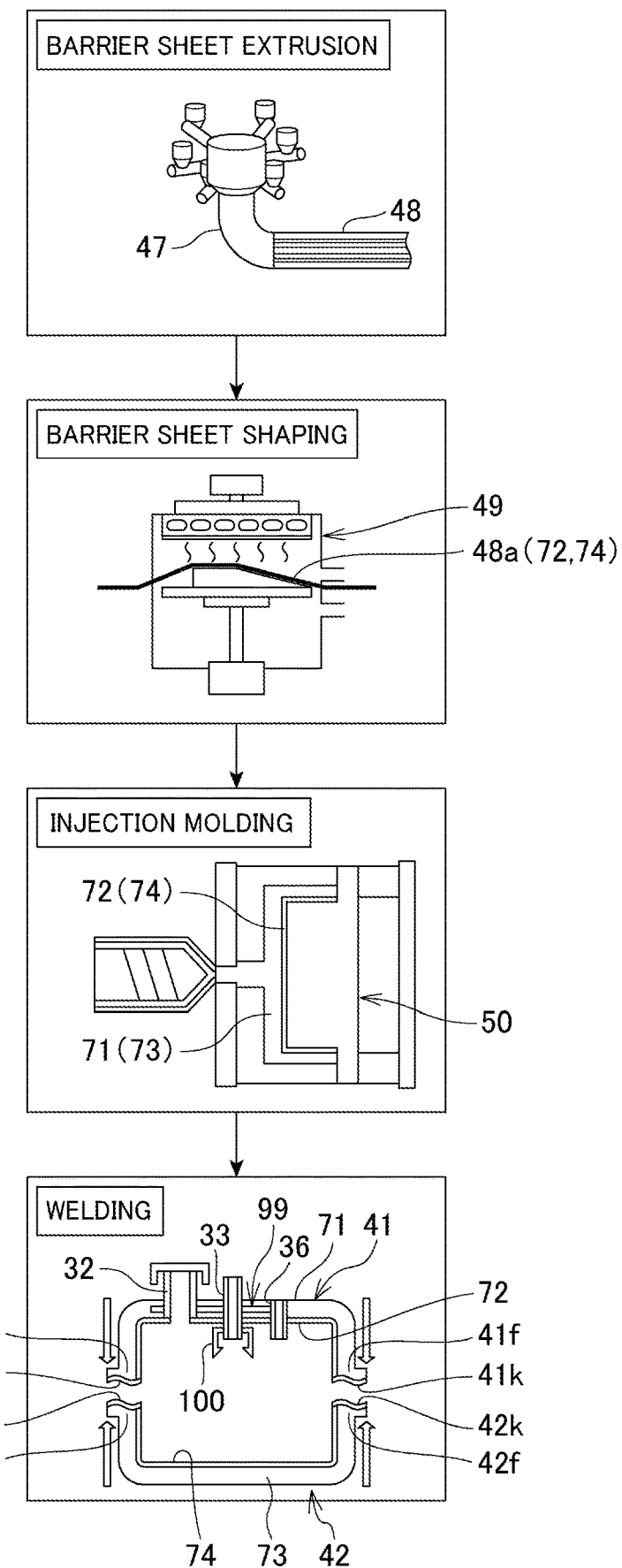
FIG. 8 is a schematic view illustrating a process for manufacturing the fuel tank.

FIG. 8 is a schematic diagram illustrating a process for manufacturing the fuel tank 30.

Referring to FIG. 8, a plurality of materials of the barrier layer 72 are fed to a die 47 for extrusion molding, and a molded article 48 with a sheet shape is extruded from the die 47.

The molded article 48 is shaped into a shape that follows the inner surface of the tank body 71 and is solidified using a vacuum molding machine 49, thereby obtaining a shaped article 48a. The peripheral edge of the barrier layer 72 that is obtained as the shaped article 48a is trimmed using a mold (not illustrated) for trimming.

The trimmed barrier layer 72 is set in a mold 50 for injection molding for molding the tank body 71 and is then integrated with the tank body 71 at the time of the injection molding of the tank body 71. In other words, the barrier layer 72 is coupled to the inner surface of the tank body 71 through insert molding. At this time, the oil filling port 32, the breather pipe 33, the upper drain pipe 36, and the like are molded integrally with the tank body 71 through insert molding.

Similarly, the barrier layer 74 on the lower side is coupled to the inner surface of the tank body 73 on the lower side through insert molding, thereby forming the lower half body 42.

At the time of the injection molding, an upper joining surface 41k that has a melting margin (not illustrated) is formed in the lower surface of the upper flange 41f of the upper half body 41, and a lower joining surface 42k that has a melting margin (not illustrated) is formed in the upper surface of the lower flange 42f of the lower half body 42. The melting margins of the upper joining surface 41k and the lower joining surface 42k are melted through heating, and the upper joining surface 41k and the lower joining surface 42k are pressure bonded, thereby integrating the upper half body 41 and the lower half body 42.

End edges of the bent opening portions 72a to 72d and 74a to 74d (see FIG. 3) are formed by trimming bent portions formed with a curvature at a peripheral edge of the molded article 48 at the time of the shaping using the vacuum molding machine 49 with a blade of the aforementioned mold (not illustrated) for trimming. Cut surfaces trimmed in the thickness direction of the opening portions 72a to 72d and 74a to 74d with the aforementioned blade are formed at distal ends of the opening portions 72a to 72d and 74a to 74d. Therefore, it is possible to easily and precisely form the end edges of the opening portions 72a to 72d and 74a to 74d (see FIG. 3).

The end edges of the opening portions 72a to 72d and 74a to 74d are incorporated in the upper half body 41 and the lower half body 42 when the upper half body 41 and the lower half body 42 are molded using the mold 50 (FIG. 5) for injection molding. Therefore, it is possible to easily incorporate the end edges of the opening portions 72a to 72d and 74a to 74d.

In the embodiment, the oil filling port 32, the breather pipe 33, the upper drain pipe 36, the flange part 90d, the flange part 33d, and the flange part 36d are integrally molded article 99 that is integrally mold in advance. The integrally molded article 99 is insert molded along with the barrier layer 72 when the injection molding of the tank body 71 is performed. At this time, the holder 100 is attached to the tapered flange part 97 of the integrally molded article 99 in advance. In this manner, the upper plate parts 93b, 95a, and 96a are formed at the upper portions of the flange parts 90d, 33d, and 36d with the resin of the tank body 71, and the lower plate parts 93c, 95b, and 96b are formed at the lower portions of the flange parts 90d, 33d, and 36d. Also, the resin of the lower plate part 95b also enters the hole 105 of the holder 100.

Therefore, the oil filling port 32, the breather pipe 33, the upper drain pipe 36, and the barrier layer 72 are integrally molded with the resin of the tank body 71.

As described above, according to the first embodiment to which the present invention is applied, the breather pipe 33 projecting to the inside and the outside of the upper wall 41a of the tank body 71 that has the barrier layer 72 is provided at the upper wall 41a, and the end edge part 72c1 of the barrier layer 72 is molded integrally with the lower plate part 95b of the support resin part 95 in the outer periphery of the breather pipe 33 in the fuel tank 30 made of a resin. Therefore, it is possible to reduce the hole of the opening portion 72c formed in the barrier layer 72 in size, to reduce influences on barrier performance, and to improve freedom of disposition of the breather pipe 33.

The breather pipe 33 is integrated with the oil filling port tubular port 90 of the oil filling port 32 and is molded integrally with the tank body 71. Therefore, it is possible to improve moldability of the breather pipe 33.

The holder 100 to and from which the gas-liquid separation unit 60 is able to be attached and detached is provided at the breather pipe 33. Therefore, it is possible to simplify attachment of the gas-liquid separation unit 60.

Also, according to the first embodiment, the holder 100 has the attachment base 101 that is larger than the diameter of the opening portion 72c of the barrier layer 72 and is provided to cover the opening portion 72c from the lower side of the upper wall (tank wall surface) 41a. According to the configuration, since the peripheral portion of the opening portion 72c of the barrier layer 72 is covered from the lower side, it is possible to protect the periphery of the opening portion 72c of the barrier layer 72 and to further improve durability.

Also, according to the first embodiment, the holder 100 includes the tapered flange part 97 integrally formed at a position of the breather pipe 33 projecting from the upper wall 41a toward the inside of the tank (the lower portion of the breather pipe 33), and the lower surface of the attachment base 101 provided on the side of the gas-liquid separation unit 60 can be engaged via the tapered flange part 97. Therefore, it is possible to attach the gas-liquid separation unit 60 with the tapered flange part 97 formed integrally with the breather pipe 33 and thereby to simplify the attachment structure for the gas-liquid separation unit 60.

<Second Embodiment>

Figure 9:
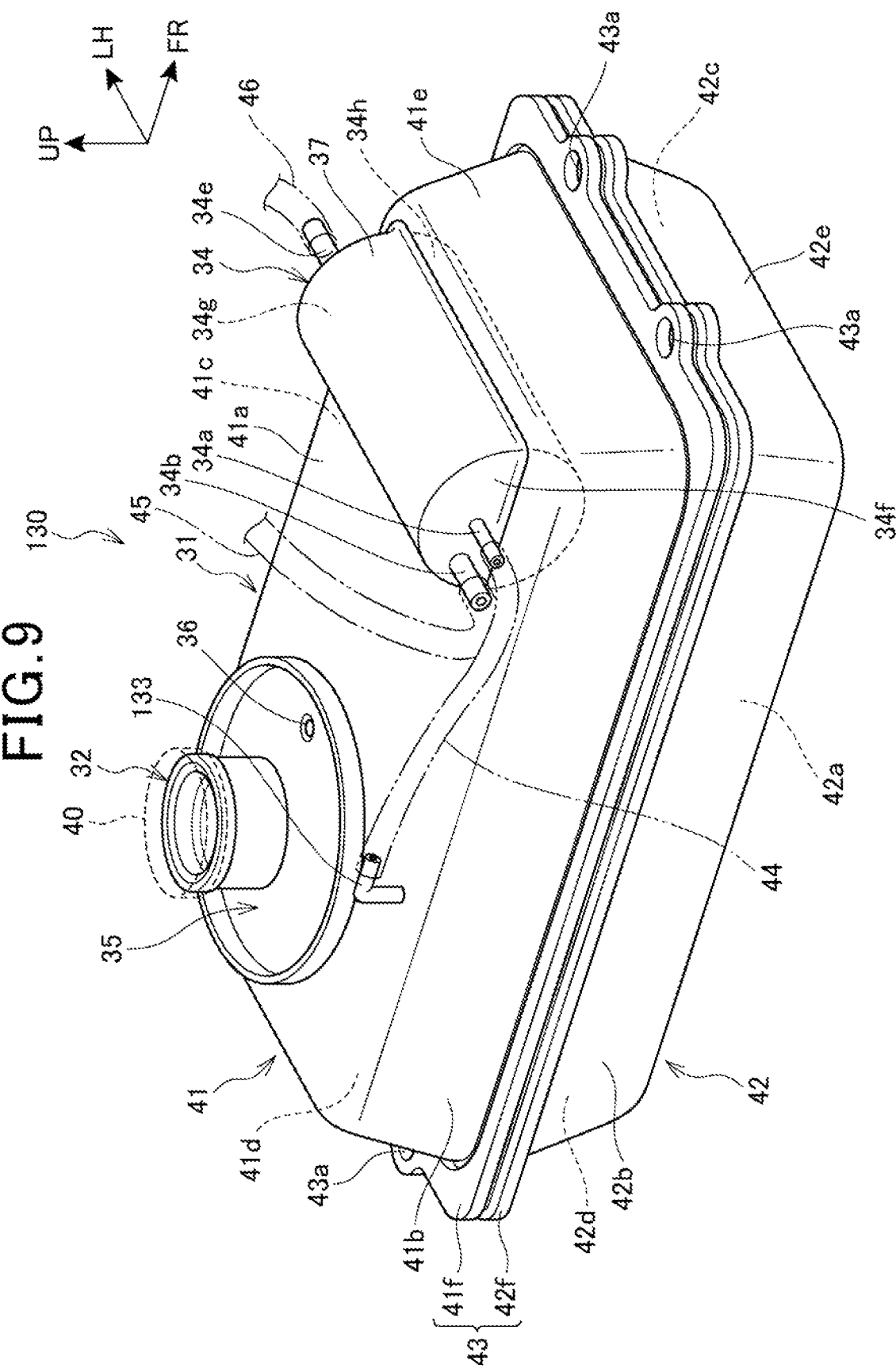
FIG. 9 is a diagram schematically illustrating a fuel tank according to a second embodiment of the present invention.

FIG. 9 is a diagram schematically illustrating a fuel tank 130 according to a second embodiment of the present invention.

In the second embodiment, the same reference signs will be applied to the same components as the components in the first embodiment, and detailed description will be omitted.

The fuel tank (tank made of resin) 130 according to the second embodiment includes a breather pipe (tubular projection) 133 instead of the breather pipe 33 in the first embodiment. In the second embodiment, a tank body 171 and a barrier layer 172 are configured similarly to the tank body 71 and the barrier layer 72 in the first embodiment other than that the tank body 171 and the barrier layer 172 are configured in accordance with the position and the shape of the breather pipe 133.

Figure 10:
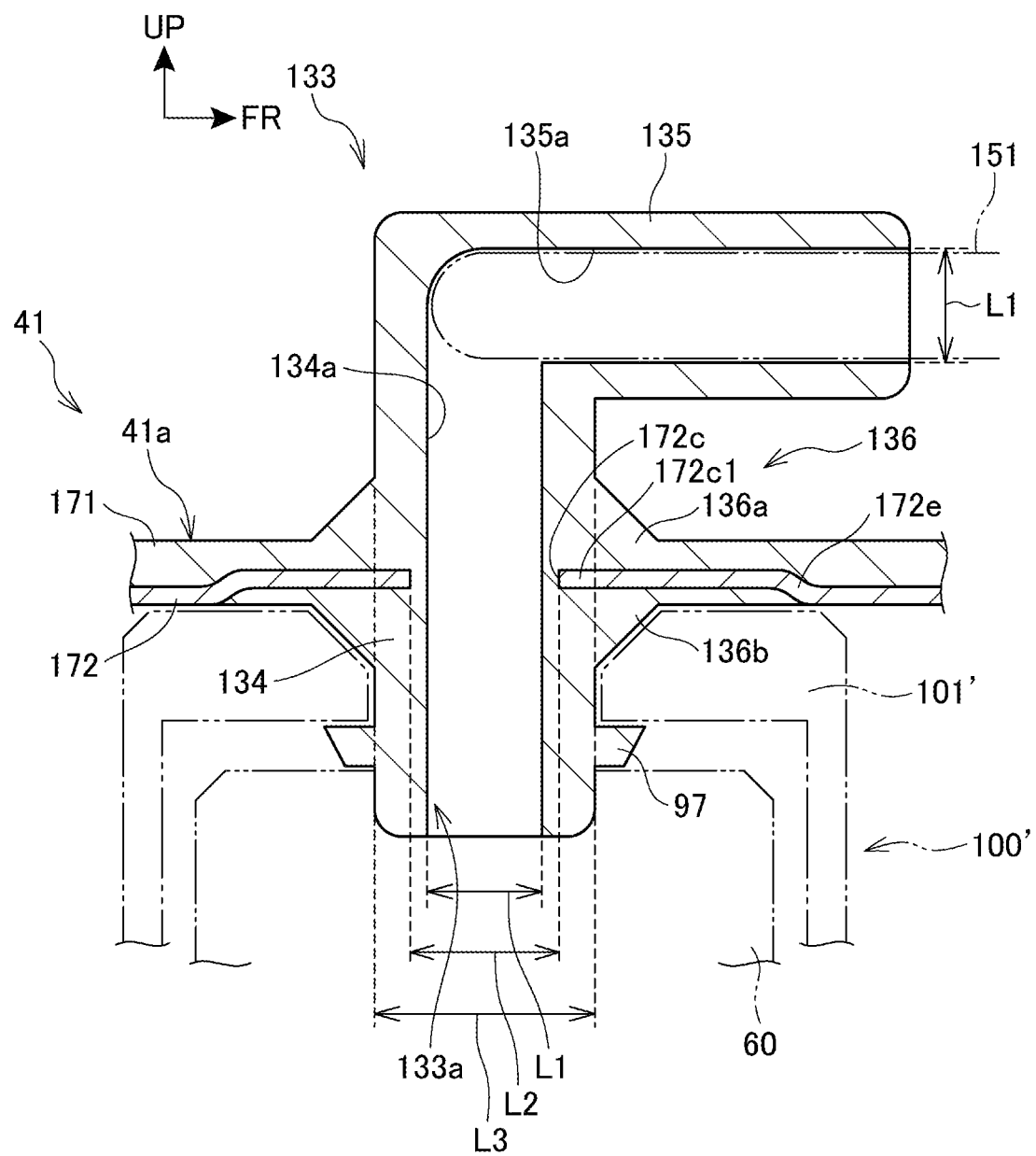
FIG. 10 is a sectional view of a breather pipe in FIG. 9.

FIG. 10 is a sectional view of the breather pipe 133.

The breather pipe 133 is formed into an L shape and includes a body (tank-side base) 134 extending in the up-down direction and a distal end 135 bent backward from an upper end of the body 134. The body 134 penetrates through the upper wall 41a in the up-down direction. A longitudinal hole 134a extending in an axial direction of the body 134 is formed in the body 134.

A charge pipe 44 (see FIG. 9) is connected to the distal end 135. A transverse hole 135a extending in an axial direction of the distal end 135 is formed at the distal end 135. Communication is established between the longitudinal hole 134a and the transverse hole 135a. The longitudinal hole 134a and the transverse hole 135a form a communication hole 133a of the breather pipe 133.

A thick part 136 is formed at an outer peripheral portion of the body 134 of the breather pipe 133. The thick part 136 is formed such that the thickness in the up-down direction increases toward the breather pipe 133 and includes an upper portion 136a expanding upward and a lower portion 136b expanding downward.

An end edge part (edge, end edge) 172c1 of an opening portion (hole) 172c of the barrier layer 172 is incorporated in the thick part 136. The end edge part 172c1 is supported in a sandwiched state between the upper portion 136a and the lower portion 136b of the thick part 136. The barrier layer 172 includes an inclined portion 172e inclined downward in the vicinity of the end edge part 172c1 and is exposed from the inside of the thick part 136 of the tank body 171 to the inner surface of the tank body 171.

The opening portion 172c is formed into a circular shape. A diameter L2 of the opening portion 172c is smaller than a diameter L3 of the outer peripheral portion of the body 134 and is larger than a diameter L1 of the communication hole 133a of the breather pipe 133.

A holder (securing part) 100' according to the second embodiment is attached to a tapered flange part 97 of the breather pipe 133. The holder 100' according to the second embodiment includes an attachment base 101' instead of the attachment base 101 according to the first embodiment. The attachment base 101' has an upper portion formed in accordance with the outer shape of the thick part 136 of the tank body 171 and is formed into a shape fitted between the lower portion 136b of the thick part 136 and the tapered flange part 97. The holder 100' is attached to the tapered flange part 97 similar to the first embodiment. In a case in which the holder 100' is attached, the attachment base 101' is sandwiched between the lower portion 136b of the thick part 136 and the tapered flange part 97 and is fixedly attached.

The breather pipe 133 according to the second embodiment is molded with a resin as a part of the tank body 171 at the time of injection molding of the tank body 171 unlike the breather pipe 33 according to the first embodiment. In other words, a recess in accordance with the outer shape of the breather pipe 133 is also formed in a mold 50 (see FIG. 8) for molding the tank body 171. However, a shape corresponding to the communication hole 133a of the breather pipe 133 is not formed in the mold 50.

At the time of the injection molding of the tank body 171, the barrier layer 172 is insert molded, and the end edge part 172c1 of the opening portion 172c is incorporated in the thick part 136 of the tank body 171. Since the communication hole 133a is not formed in the breather pipe 133 at the time of the injection molding, the longitudinal hole 134a and the transverse hole 135a are formed in the breather pipe 133 through punching using a working jig 151 after the molding, thereby forming the communication hole 133a.

The working jig 151 passes through the inside of the opening portion 172c with respect to the barrier layer 172 at the time of the punching, the barrier layer 172 is not cut. Also, since fluidity of the resin is likely to be stabilized at the part corresponding to the thick part 136 in the state in which there is no communication hole 133a in the mold 50, the position of the barrier layer 172 is easily controlled. Therefore, it is easy to reduce the diameter L2 of the opening portion 172c and to cause the barrier layer 172 to approach the position of the communication hole 133a. Therefore, it is possible to form the fuel tank 30 with satisfactory barrier properties.

As described above, according to the second embodiment to which the present invention is applied, the thick part 136 is provided at the body 134 on the tank side of the breather pipe 133, and the end edge part 172c1 of the opening portion 172c of the barrier layer 172 is disposed inside the thick part 136. Therefore, it is possible to enhance attachment rigidity of the end edge part 172c1 of the opening portion 172c of the barrier layer 172 due to the thick part 136 and to improve durability.

The aforementioned embodiments merely illustrate an aspect of the present invention, and arbitrary modifications and applications can be made without departing from the gist of the present invention.

For example, although the breather pipe 33 linearly extending has been described in the first embodiment and the L-shaped breather pipe 133 has been described in the second embodiment according to the aforementioned embodiments, the L shape may be employed in the first embodiment while the linear shape may be employed in the second embodiment.

Third Embodiment

Figure 11:
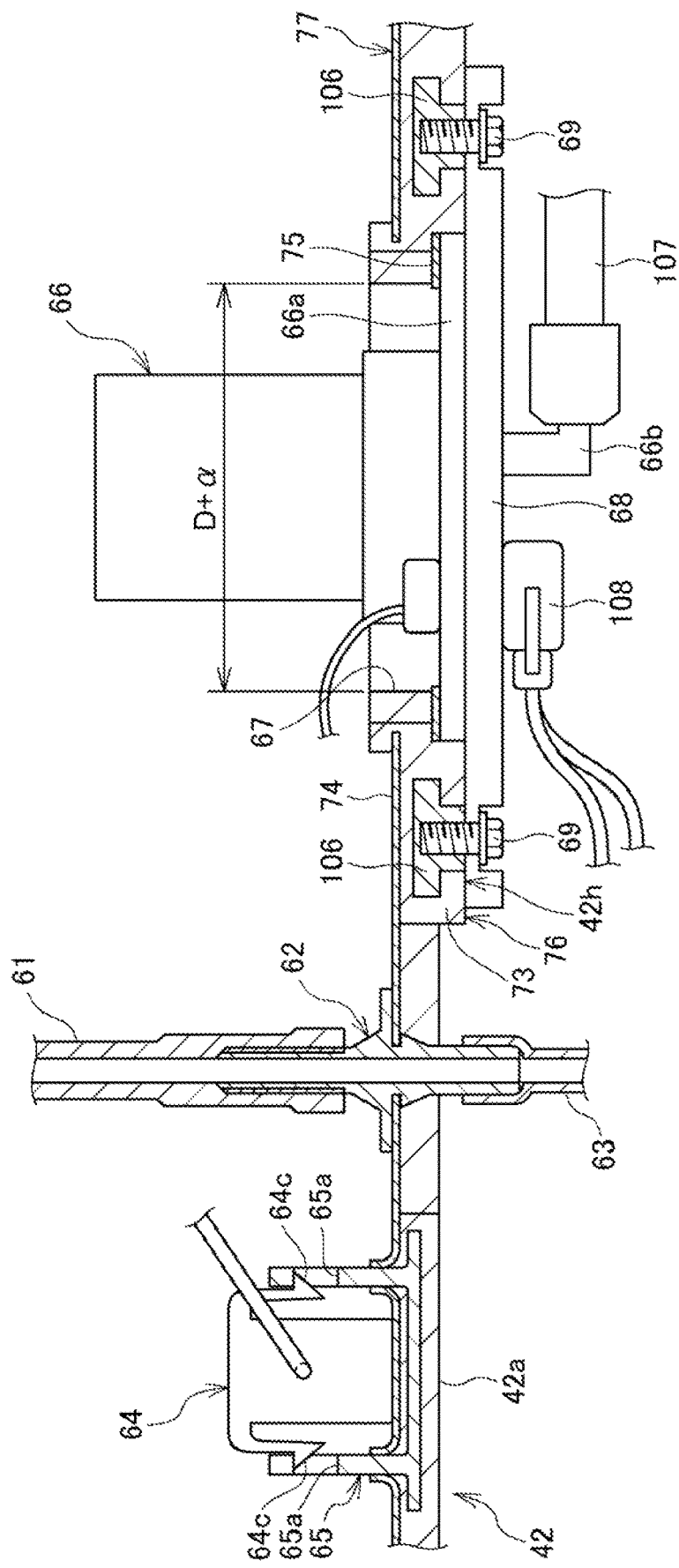
FIG. 11 is a sectional view illustrating a lower half body and detailed structures of components provided in the lower half body according to a third embodiment of the present invention.

FIG. 11 is a sectional view illustrating detailed structures of a lower half body 42 and components provided in the lower half body 42 according to a third embodiment of the present invention.

In the third embodiment, the same reference signs will be applied to the same components as components in the first embodiment or the second embodiment, and detailed description will be omitted.

A fuel pump 66 is attached to a bottom wall 42a of the lower half body 42.

The fuel pump 66 includes, at a lower end, a pump lower portion 66a for attaching the bottom wall 42a. An opening 67 through which the fuel pump 66 is inserted into the fuel tank 30 (see FIG. 2) is formed in the bottom wall 42a.

An attachment plate 68 is attached to a tank body-side attachment part 42h formed at an edge of the opening 67 in a state in which the pump lower portion 66a of the fuel pump 66 is attached to an annular attachment plate 68 made of metal. A sealing member 75 is provided between the edge of the opening 67 and a pump lower portion 66a to seal the portion between the edge of the opening 67 and the pump lower portion 66a.

An inner diameter of the opening 67 is D+α (α is a dimensional tolerance), and the inner diameter of the opening 67 is checked by confirming that a columnar gauge (outer diameter=D) corresponding to a human hand (for example, a fist) can be inserted into the opening 67 and another columnar gauge (outer diameter=D+β) cannot be inserted into the opening 67. In addition, β is a value set in advance to be significantly larger than α.

The tank body-side attachment part 42h includes nut members 106 that are a plurality of insert nuts made of metal and insert molded with the tank body 76 of the lower half body 42, and the attachment plate 68 is attached to the tank body-side attachment part 42h with bolts 69 respectively screwed into the nut members 106.

In a case in which the fuel tank 30 (see FIG. 4) is assembled in FIG. 4, an upper half body 41 and the lower half body 42 are coupled, and a drain tube 61 is then inserted into the fuel tank 30 from the opening 67 with hands in FIG. 11. Then, an upper end of the drain tube 61 is connected to an upper drain pipe 36, and a lower end of the drain tube 61 is connected to a lower drain pipe (tubular projection) 62 in FIG. 4. Thereafter, the fuel pump 66 is attached to the tank body-side attachment part 42h in FIG. 11.

A locking member 65 for a level meter 64 and a lower drain pipe 62 to which the lower end of the drain tube 61 is connected are insert molded at the bottom wall 42a.

The level meter 64 is a measurement device configured to measure a remaining amount of fuel in the fuel tank 30, and the plurality of locking parts 64c included in the level meter 64 are respectively locked at a plurality of locked holes 65a provided in the locking member 65, and the level meter 64 is secured to the locking member 65.

An ejection port 66b projects downward from the pump lower portion 66a of the fuel pump 66, and a fuel tube 107 is connected to the ejection port 66*b*. The fuel tube 107 extends up to an intake device of an engine 18 (see FIG. 1).

A connector 108 for supplying power to the fuel pump 66 and outputting a detection signal obtained by the level meter 64 is connected to the lower portion of the pump lower portion 66*a*.

As illustrated in FIGS. 1, 4, and 11 described above, the fuel tank 30 made of a resin is configured such that the tank body 76 made of a resin is formed by combining the tank bodies 71 and 73 as a pair of split bodies.

The lower drain pipe 62 that serves as the piping coupling means to which the drain tube 61 is connected is formed with a resin integrally with the tank body 76 such that the lower drain pipe 62 penetrates through the inside and the outside of the tank body 76, and the opening 67 that serves as the device attachment port is provided at the tank body 76 such that the drain tube 61 can be assembled form the opening 67.

According to the configuration, it is possible to reduce the number of lower drain pipes 62, and in a case in which the tank body 76 is split, it is possible to easily assemble the drain tube 61 from the opening 67 after coupling the tank body 76 and to reduce the number of operations for assembling the fuel tank 30.

As illustrated in FIG. 11 described above, the opening 67 has a size with which the opening 67 is covered with the attachment plate 68 that serves as the device attachment member configured to prevent transmission of the fuel and which the drain tube 61 that serves as the piping member can be inserted into the opening 67.

According to the configuration, since the opening 67 is covered with the attachment plate 68 configured to prevent transmission of the fuel, it is possible to prevent transmission of the fuel with the attachment plate 68 and to improve assembly properties of the fuel tank 30 by forming the opening 67 to have a size with which the drain tube 61 is accommodated therein.

Also, since the tank body 76 has the barrier layer 77, and the lower drain pipe 62 is integrally formed inside and outside the tank body 76 and the barrier layer 77 such that the lower drain pipe 62 penetrates through the barrier layer 77, the lower drain pipe 62 penetrates through the barrier layer 77, and it is thus possible to minimize a decrease in area of the barrier layer 77.

Figure 12:
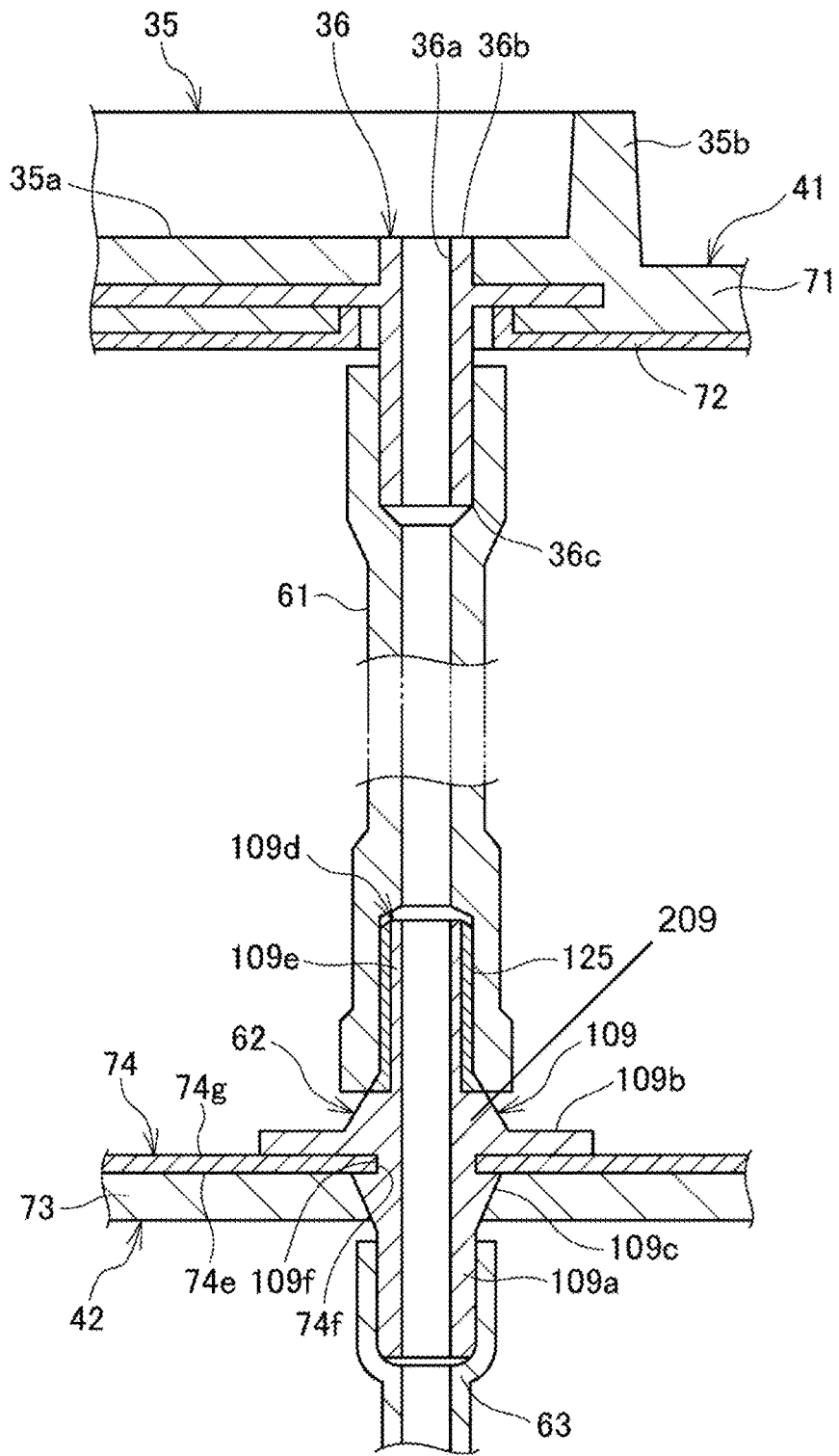
FIG. 12 is a sectional view illustrating a connection state of a drain tube.

FIG. 12 is a sectional view illustrating a connection state of the drain tube 61.

The lower drain pipe 62 is made up of a connection part body 109 that penetrates through the barrier layer 74 and a cylindrical cap tube 125 fitted to an end of the connection part body 109.

The connection part body 109 is made up of a cylindrical part 109*a* that penetrates through the barrier layer 74 and an outer peripheral resin part 209 is formed integrally with the cylindrical part 109*a* and includes a one-side flange part 109*b* in contact with an inner surface 74*g* of the barrier layer 74, and an other-side flange part 109*c* in contact with an outer surface 74*e* of the barrier layer 74.

The cylindrical part 109*a* has a small diameter part 109*e* formed at one end 109*d* on the inner side of the tank, and a cylindrical cap tube 125 is elastically fitted into the small diameter part 109*e*. A lower end of the drain tube 61 with flexibility is connected to the cylindrical cap tube 125. Since the drain tube 61 and the cylindrical cap tube 125 are connected to each other with deflection, a reaction force due to deflection is generated at the fitting portion between the drain tube 61 and the cylindrical cap tube 125, and it is thus possible to achieve a state in which the drain tube 61 is unlikely to fall off from the cylindrical cap tube 125.

An annular recessed part 109*f* is formed between the one-side flange part 109*b* and the other-side flange part 109*c*, and the annular recessed part 109*f* is fitted into the through-hole 74*f* formed in the barrier layer 74. Also, the lower drain pipe 62 is insert molded while liquid tightness is secured, by sandwiching the barrier layer 74 between the one-side flange part 109*b* and the other-side flange part 109*c*. It can also be said that the thick part is formed at the tank-side base of the cylindrical part 109*a*, and the annular recessed part 109*f* is formed at the thick part, thereby providing the one-side flange part 109*b* and the other-side flange part 109*c* at the thick part.

The lower drain tube 63 is connected to the other end of the cylindrical part 109*a* outside the tank.

As illustrated in FIG. 12 described above, since the lower drain pipe 62 is made up of the cylindrical part 109*a* and the cylindrical cap tube 125 that is elastically fitted onto the outer periphery of the cylindrical part 109*a*, and the drain tube 61 with flexibility is connected to the cylindrical cap tube 125, a deflection reaction force is generated at the drain tube 61 fitted to the cylindrical cap tube 125, and it is possible to achieve a state in which the drain tube 61 is unlikely to fall off from the cylindrical cap tube 125.

Also, as illustrated in FIGS. 2, 3, and 12, since the piping member is the drain tube 61 connected to the lower drain pipe 62, the pair of tank bodies 71 and 73 are included in the upper half body 41 that serves as the tank upper half body that has an upper surface and the lower half body 42 that serves as the tank lower half body that has a bottom surface, the upstream-side end of the drain tube 61 is connected to the tank body 71 on the upper side, and the lower drain pipe 62 to which the downstream-side end of the drain tube 61 is penetrates through the bottom wall 52*a* of the tank body 76 and extends to the outside of the fuel tank 30, the drain tube 61 is not exposed to the outside, and it is thus possible to improve an appearance.

Also, as illustrated in FIG. 12, the lower drain pipe 62 includes the cylindrical part 109*a*, the tank body 76 has the barrier layer 77 configured to prevent transmission of the fuel, and the lower drain pipe 62 is formed as an insert molded article at the tank body 76 with the barrier layer 77 sandwiched between the one-side flange part 109*b* and the other-side flange part 109*c* that serve as the pair of flange parts sticking out of the cylindrical part 109*a* and is maintained in a liquid-tight state, the lower drain pipe 62 is coupled integrally to the tank body 76 with the barrier layer 77 sandwiched between the pair of the one-side flange part 109*b* and the other-side flange part 109*c* as the insert molded article, and it is thus possible to improve durability and liquid tightness of the barrier layer 77.

According to the embodiment, the tank body 76 has the barrier layer 77 configured to prevent transmission of the fuel, and the lower drain pipe 62 to which the drain tube 61 is connected is formed inside and outside the tank body 76 and the barrier layer 77 such that the lower drain pipe 62 penetrates through the barrier layer 77. According to the configuration, it is possible to reduce the hole formed in the barrier layer 77 in size, to reduce influences on barrier performance, and to improve freedom of disposition of the lower drain pipe 62 by the end edge of the barrier layer 77 being molded integrally with the one-side flange part 109*b* and the other-side flange part 109*c* of the lower drain pipe 62 to which the drain tube 61 is connected. Also, it is possible to enhance attachment rigidity of the barrier layer 77 and to improve durability. Further, it is possible to minimize a decrease in area of the barrier layer 77 by the lower drain pipe 62 penetrating through the barrier layer 77.

Fourth Embodiment

Figure 13:
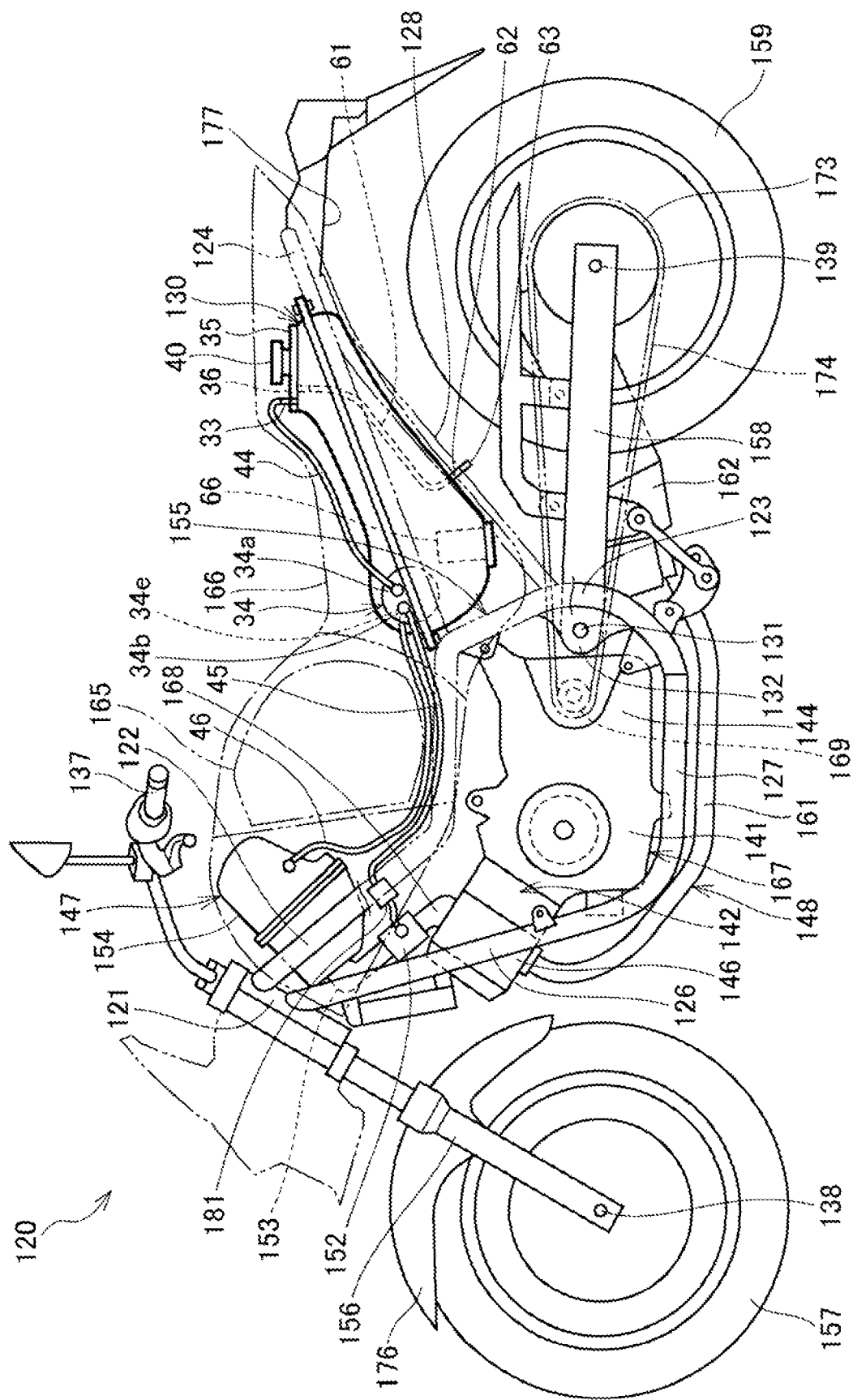
FIG. 13 is a left side view illustrating a motorcycle on which a fuel tank according to a fourth embodiment of the present invention is mounted.

FIG. 13 is a left side view illustrating a motorcycle 120 in which a fuel tank 130 according to a fourth embodiment is mounted. In the fourth embodiment, the same reference signs will be applied to the same components as components in the third embodiment, and detailed description will be omitted.

The fuel tank 130 employs the connection structure of the drain tube 61 of the fuel tank 30 according to the third embodiment illustrated in FIGS. 11 and 12. Also, an outline of the fuel tank 130 is illustrated by a thick line for easiness of understanding of the shape of the fuel tank 130.

The motorcycle 120 includes a front wheel 157 supported at a front end of a vehicle body frame 155 via a front fork 156, a back wheel 159 supported at a back lower portion of the vehicle body frame 155 via a swing arm 158, and a seat 166 supported at an upper portion of the vehicle body frame 155. In this manner, the motorcycle 120 is a saddle-riding vehicle on which a rider rides by straddling on the seat 166.

The vehicle body frame 155 includes a head pipe 121, a pair of left and right main frames 122, a pair of left and right center frames 123, a pair of left and right seat frames 124, a pair of left and right down frames 126, a pair of left and right lower frames 127, and a pair of left and right sub-frames 128.

The head pipe 121 forms the front end of the vehicle body frame 155 and supports the front fork 156 in a steerable manner. The left and right main frames 122 extend backward and obliquely downward from the upper portion of the head pipe 121 and supports an accommodation box 165 disposed in front of the seat 166.

The left and right center frames 123 extend downward from back ends of the main frames 122. Pivot plates 132 are respectively attached to the left and right center frames 123, and a pivot shaft 131 that supports a front end of the swing arm 158 in a swingable manner is bridged over the left and right pivot plates 132.

The left and right seat frames 124 respectively extend backward and obliquely upward from the back ends of the left and right main frames 122 and support the fuel tank 130 made of a resin and the seat 166. The left and right down frames 126 extend downward and obliquely backward from the lower portion of the head pipe 121 below the left and right main frames 122. The left and right lower frames 127 respectively extend downward from lower ends of the left and right down frames 126, further extend backward, and are respectively connected to lower ends of the left and right center frames 123. The left and right sub-frames 128 are respectively connected to the left and right center frames 123 and the left and right seat frames 124.

An engine 167 is supported at the left and right main frames 122, the center frames 123, and the down frames 126.

The front fork 156 supports a bar handle 137 at an upper end thereof and supports the front wheel 157 at a lower end thereof via a front axle 138. The swing arm 158 supports the back wheel 159 at the back end via a back axle 139.

The engine 167 includes a crankcase 141 and a cylinder part 142 extending forward and obliquely upward from a front upper portion of the crankcase 141.

A transmission 144 is integrally provided at a back portion of the crankcase 141.

The cylinder part 142 includes a cylinder head 146, an intake device 147 is connected to a back portion of the cylinder head 146, and an exhaust device 148 is connected to a front portion of the cylinder head 146.

The intake device 147 includes a throttle body 152 connected to the cylinder head 146 via an intake pipe 168 and an air cleaner 154 connected to the throttle body 152 via a connecting tube 153. The exhaust device 148 includes an exhaust pipe 161 connected to the cylinder head 146 and a muffler 162 connected to a back end of the exhaust pipe 161.

A driving sprocket 169 is attached to an output shaft of the transmission 144, a driven sprocket 173 is attached to the back wheel 159, and a chain 174 is stretched over the driving sprocket 169 and the driven sprocket 173. A power is transmitted from the transmission 144 to the back wheel 159 via the chain 174.

The front wheel 157 is covered with a front fender 176 from the upper side. The back wheel 159 is covered with a rear fender 177 from the upper side.

The fuel tank 130 includes a canister 34 at a front upper portion and includes a fuel pump 66 at a front lower portion. A charge port 34a of the canister 34 and the breather pipe 33 are connected with a charge pipe 44.

A purge port 34b of the canister 34 and the throttle body 152 are connected with a purge pipe 45. An evaporated fuel in the canister 34 is guided to an intake path of the throttle body 152 via the purge pipe 45. A purge control pipe 181 configured to control the amount of introduced evaporated fuel (purge amount) in accordance with a driving state of the engine 167 is provided at a midpoint of the purge pipe 45.

Also, a new air introduction port 34e of the canister 34 and the air cleaner 154 are connected with a new air introduction pipe 46. New air in the air cleaner 154 is introduced into the canister 34 via the new air introduction pipe 46.

The upper drain pipe 36 and the lower drain pipe 62 are connected with the drain tube 61 disposed in the fuel tank 130. An upper end of the lower drain tube 63 is connected to a lower end of the lower drain pipe 62. A lower end of the lower drain tube 63 is disposed below the rear fender 177, and the fuel is discharged from a lower end opening of the lower drain tube 63.

The aforementioned embodiments merely illustrate an aspect of the present invention, and arbitrary modifications and applications can be made without departing from the gist of the present invention.

Although the oil filling port 32, the breather pipe 33, and the upper drain pipe 36 are insert molded as the integrally molded article 99 at the tank body 71 to manufacture the fuel tank 30 in the aforementioned first embodiment, the oil filling port 32, the breather pipe 33, and the upper drain pipe 36 may be respectively insert molded as separate members.

Although the oil filling port 32, the breather pipe 33, and the upper drain pipe 36 are insert molded as the integrally molded article 99 along with the barrier layer 72 at the time of molding the tank body 71 with the resin to manufacture the fuel tank 30 in the aforementioned embodiments, the barrier layer is insert molded at the time of molding integrally molded article, and further the integrally molded barrier layer 72 and the integrally molded article 99 may further be insert molded at the time of molding the tank body 71 with the resin.

Further, although the upper half body 41 and the lower half body 42 have been described as examples of the split bodies that form the fuel tanks 30 and 130 in the aforementioned respective embodiments, the present invention is not limited thereto, and each of the fuel tanks 30 and 130 may be split into three or more split bodies. For example, each of the fuel tanks 30 and 130 may be formed by joining the lower half body 42 configured only of a single split body to the upper half body made up of two split bodies.

Also, the fuel tanks 30 and 130 may be mounted on or installed in not only a vehicle but also an industrial machine or a facility in which an engine is mounted.

Although the attachment plate 68 made of metal is used to attach the fuel pump 66 to the lower portion of the fuel tank 30 in FIG. 11, the attachment plate 68 may be made of a resin that highly prevents transmission instead of the metal.

Although the fuel tanks 30 and 130 according to the present invention are mounted in the motorcycles 10 and 120, the fuel tanks 30 and 130 are not limited thereto and can be applied to saddle-riding vehicles including saddle-riding vehicles other than the motorcycles 10 and 120. Also, the saddle-riding vehicles generally include vehicles on which riders ride by straddling on vehicle bodies and are vehicles including not only motorcycles (including bicycles provided with motors) but three-wheel vehicles and four-wheel vehicles categorized in all-terrain vehicles (ATVs).

REFERENCE SINGS LIST

10, 120 Motorcycle (saddle-riding vehicle)
30, 130 Fuel tank (tank made of resin)
32 Oil filling port
33, 133 Breather pipe (tubular projection)
33a, 133a Communication hole
35 Oil filling tray part
41 Upper half body (tank upper half body)
41a Wall surface
42 Lower half body (tank lower half body)
42a Bottom wall (wall surface)
60 Gas-liquid separation unit (gas-liquid separation chamber)
61 Drain tube (piping member)
62 Lower drain pipe (tubular projection, piping coupling means)
67 Opening (device attachment port)
68 Attachment plate (device attachment member)
71, 73 Tank body (split body)
76, 171 Tank body
72, 74, 77, 172 Barrier layer
72c1, 172c1 end edge (end edge part, edge)
90 Insert resin member
95b Outer peripheral resin part
100, 100' Securing part
101, 101' Attachment base
109a Cylindrical part
109b One-side flange part
109c Other-side flange part
117 Gas layer chamber
125 Cylindrical cap tube
136 Thick part (outer peripheral resin part)
209 Outer peripheral resin part (thick part)

The invention claimed is:

1. A tank made of resin, wherein a tubular projection projecting to an inside and an outside of a tank wall surface of a tank body that has a barrier layer is provided at the tank wall surface, the barrier layer is provided on an inner surface of the tank body, and an end edge of the barrier layer is molded integrally with an outer peripheral resin part of the tubular projection,
   wherein a securing part to and from which a gas-liquid separation chamber is able to be attached and detached is provided at the tubular projection, and
   the securing part has an attachment base that is larger than a width of a hole of the barrier layer,
   the outer peripheral resin part is provided at a tank-side base of the tubular projection,
   the outer peripheral resin part is formed such that a thickness of the outer peripheral resin part in a thickness direction of the tank wall surface, which is in an axial direction of the tubular projection, increases toward a longitudinal axis of the tubular projection and the outer peripheral resin part includes a portion expanding to the outside and a portion expanding to the inside,
   an end edge of the hole of the barrier layer is disposed inside the outer peripheral resin part,
   the end edge of the hole is supported by being sandwiched between the portion expanding to the outside and the portion expanding to the inside,
   a notch that is larger than the width of the hole is formed in the attachment base at a portion facing the tubular projection, and the attachment base is provided to cover the portion expanding to the inside from the inside of the tank wall surface.

2. The tank made of resin according to claim 1, wherein the tubular projection includes a flange that is integrally formed at a position of the tubular projection projecting from the tank wall surface to the inside of the tank, and the attachment base is attached via the flange.

* * * * *